United States Patent
Ye et al.

(10) Patent No.: US 9,386,316 B2
(45) Date of Patent: Jul. 5, 2016

(54) ADAPTIVE CODING OF VIDEO BLOCK HEADER INFORMATION

(75) Inventors: Yan Ye, San Diego, CA (US); Marta Karczewicz, San Diego, CA (US); Rahul Panchal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1199 days.

(21) Appl. No.: 12/169,460

(22) Filed: Jul. 8, 2008

(65) Prior Publication Data

US 2009/0175334 A1    Jul. 9, 2009

Related U.S. Application Data

(60) Provisional application No. 60/979,734, filed on Oct. 12, 2007.

(51) Int. Cl.
| | |
|---|---|
| H04N 7/12 | (2006.01) |
| H04N 19/12 | (2014.01) |
| H04N 19/105 | (2014.01) |
| H04N 19/50 | (2014.01) |
| H04N 19/159 | (2014.01) |
| H04N 19/176 | (2014.01) |
| H04N 19/70 | (2014.01) |
| H04N 19/46 | (2014.01) |
| H04N 19/593 | (2014.01) |

(52) U.S. Cl.
CPC ............. *H04N 19/12* (2014.11); *H04N 19/105* (2014.11); *H04N 19/159* (2014.11); *H04N 19/176* (2014.11); *H04N 19/46* (2014.11); *H04N 19/50* (2014.11); *H04N 19/593* (2014.11); *H04N 19/70* (2014.11)

(58) Field of Classification Search
None
See application file for complete search history.

(56) References Cited

U.S. PATENT DOCUMENTS

| | | | |
|---|---|---|---|
| 5,260,693 | A | 11/1993 | Horsley |
| 5,751,694 | A | 5/1998 | Toft |

(Continued)

FOREIGN PATENT DOCUMENTS

| | | |
|---|---|---|
| CN | 1225777 A | 8/1999 |
| EP | 1619901 A2 | 1/2006 |

(Continued)

OTHER PUBLICATIONS

Lamy et al., "Lower bounds on the existence of binary error-correcting variable-length codes", IEEE 2003, 4 pages.*

(Continued)

*Primary Examiner* — Christopher Crutchfield
*Assistant Examiner* — Thinh Tran
(74) *Attorney, Agent, or Firm* — Todd E. Marlette

(57) ABSTRACT

This disclosure describes techniques for adaptively coding video block header information based on previously encoded video blocks. A video encoder may adaptively select a coding table for use in encoding a syntax element of a current video block based on corresponding syntax elements of one or more previously encoded blocks. In one aspect, the video encoder may adaptively select the coding table for use in encoding a block type of the current block based on block types of one or more video blocks adjacent to the current video block, i.e., neighboring video blocks. The video encoder may also predict one or more other header syntax elements of the current block based on at least one of the previously encoded video blocks. If prediction is successful, the video encoder may encode a flag to indicate the success of prediction.

81 Claims, 7 Drawing Sheets

(56) References Cited

U.S. PATENT DOCUMENTS

| | | | |
|---|---|---|---|
| 6,345,121 | B1 | 2/2002 | Matsumoto |
| 6,414,608 | B1 | 7/2002 | Nishida et al. |
| 6,549,671 | B1 | 4/2003 | Miyagoshi et al. |
| 6,646,578 | B1 * | 11/2003 | Au ................................ 341/67 |
| 7,469,070 | B2 * | 12/2008 | Winger .......................... 382/239 |
| 7,664,182 | B2 * | 2/2010 | Kadono et al. .......... 375/240.23 |
| 8,335,265 | B2 | 12/2012 | Hannuksela et al. |
| 2001/0022856 | A1 | 9/2001 | Matsumoto |
| 2001/0055336 | A1 | 12/2001 | Krause et al. |
| 2003/0138150 | A1 * | 7/2003 | Srinivasan ........... H04N 19/136 382/238 |
| 2003/0202594 | A1 | 10/2003 | Lainema |
| 2004/0240559 | A1 | 12/2004 | Prakasam et al. |
| 2004/0268329 | A1 * | 12/2004 | Prakasam ...................... 717/141 |
| 2005/0053158 | A1 | 3/2005 | Regunathan et al. |
| 2005/0152448 | A1 | 7/2005 | Crinon et al. |
| 2005/0249291 | A1 * | 11/2005 | Gordon et al. ........... 375/240.18 |
| 2006/0022848 | A1 * | 2/2006 | Nomura .......................... 341/50 |
| 2006/0115000 | A1 | 6/2006 | Otsuka |
| 2006/0126955 | A1 | 6/2006 | Srinivasan |
| 2007/0030180 | A1 | 2/2007 | Yang et al. |
| 2007/0046504 | A1 | 3/2007 | Ridge et al. |
| 2007/0097850 | A1 | 5/2007 | Park et al. |
| 2007/0160302 | A1 | 7/2007 | Han et al. |
| 2007/0171975 | A1 | 7/2007 | Smith et al. |
| 2007/0200737 | A1 | 8/2007 | Gao et al. |
| 2007/0223579 | A1 | 9/2007 | Bao |
| 2008/0240252 | A1 * | 10/2008 | He ........................... 375/240.24 |
| 2009/0175349 | A1 | 7/2009 | Ye et al. |
| 2013/0057646 | A1 | 3/2013 | Chen et al. |
| 2013/0188699 | A1 | 7/2013 | Joshi et al. |

FOREIGN PATENT DOCUMENTS

| | | |
|---|---|---|
| GB | 2434270 A | 7/2007 |
| JP | H09135227 A | 5/1997 |
| JP | 10191324 A | 7/1998 |
| JP | 10510132 | 9/1998 |
| JP | H10276436 A | 10/1998 |
| JP | 11122619 A | 4/1999 |
| JP | H11317942 A | 11/1999 |
| JP | 2000013800 A | 1/2000 |
| JP | 2001057520 A | 2/2001 |
| JP | 2003032678 A | 1/2003 |
| JP | 2003153265 A | 5/2003 |
| JP | 2004064725 A | 2/2004 |
| JP | 2006157678 A | 6/2006 |
| JP | 2007020002 A | 1/2007 |
| JP | 4855417 B2 | 1/2012 |
| KR | 20060004707 A | 1/2006 |
| KR | 20060007786 | 1/2006 |
| RU | 2004131857 | 4/2005 |
| TW | 200726259 | 7/2007 |
| WO | 9713374 A1 | 4/1997 |
| WO | WO03084076 A1 | 10/2003 |
| WO | WO2006042160 | 4/2006 |
| WO | WO2007010690 A1 | 1/2007 |
| WO | WO2007027402 A2 | 3/2007 |
| WO | WO2007063612 A1 | 6/2007 |
| WO | WO2007081085 A1 | 7/2007 |
| WO | WO2007112417 | 10/2007 |

OTHER PUBLICATIONS

Bao Y et al: "FGS complexity reduction" Joint Video Team (JVT) of ISO/IEC MPEG & ITU-T VCEG(ISO/IEC JTC1/SC29/WG11 and ITU-TSG16 Q6), XX, XX, No. JVT-T087, Dec. 20, 2006, XP030006574.

International Search Report & Written Opinion—PCT/US2008/079636, International Search Authority—European Patent Office—Apr. 8, 2009.

Ye, Y., et al., "Improvements to FGS Layer Variable Length Coder," Joint Video Team (JVT) of ISO/IEC MPEG & ITU-T VCEG (ISO/IEC JTC1/SC29/WG11 and ITU-T SG16 Q.6), 19th Meeting: Geneva, Switzerland, Mar. 31-Apr. 7, 2006, No. JVT-S066, Mar. 31, 2006, XP002458086, pp. 1-10.

Ye (Qualcomm): "Improved intra coding", 33. VCEG Meeting; 82. MPEG Meeting; Oct. 20, 2007; Shenzhen; (Video Coding Experts Group of ITU-T SG.16), No. VCEG-AG11, Oct. 20, 2007, XP030003615, ISSN: 0000-0095.

Taiwan Search Report—TW097139292—TIPO—Feb. 8, 2013.

* cited by examiner

ADAPTIVE CODING OF VIDEO BLOCK HEADER INFORMATION

This application claims the benefit of U.S. Provisional Application No. 60/979,734, filed Oct. 12, 2007, the entire content of which is incorporated herein by reference.

TECHNICAL FIELD

This disclosure relates to digital video coding and, more particularly, coding of header information of blocks of a video sequence.

BACKGROUND

Digital video capabilities can be incorporated into a wide range of devices, including digital televisions, digital direct broadcast systems, wireless communication devices, wireless broadcast systems, personal digital assistants (PDAs), laptop or desktop computers, digital cameras, digital recording devices, video gaming devices, video game consoles, cellular or satellite radio telephones, and the like. Digital video devices implement video compression techniques, such as MPEG-2, MPEG-4, or H.264/MPEG-4, Part 10, commonly called Advanced Video Coding (AVC), to transmit and receive digital video more efficiently. Video compression techniques perform spatial and temporal prediction to reduce or remove redundancy inherent in video sequences.

In video coding, video compression typically includes spatial prediction and/or motion estimation and motion compensation to generate a prediction video block. Intra-coding relies on spatial prediction to reduce or remove spatial redundancy among video blocks within a given video frame. Spatial prediction may be performed for a number of different intra-coding block types, such as Intra 16×16 block types, Intra 8×8 block types, and Intra 4×4 block types in the case of H.264/MPEG-4 Part 10 AVC. Inter-coding relies on temporal prediction to reduce or remove temporal redundancy among video blocks of successive video frames of a video sequence. Temporal prediction may also be performed for a number of different inter-coding block types, such as Inter 16×16, Inter 16×8, Inter 8×16, Inter 8×8, Inter 8×4, Inter 4×8, and Inter 4×4 in the case of H.264/MPEG-4 Part 10 AVC.

After spatial or temporal prediction, a block of residual information is generated by subtracting the prediction video block from the original video block that is being coded. Thus, the residual information quantifies the differences between the prediction video block and the original block. The video encoder encodes the residual information of the block along with header information of the block. The header information of the block may indicate the block type of the current video block as well as additional information associated with the current video block, such as a prediction mode, a luma coded block pattern (CBP), a chroma CBP, one or more motion vectors and the like. The video encoder generally encodes the residual information and the header information using arithmetic codes, variable length codes (VLCs), fixed length codes or a combination thereof. Examples include context-adaptive binary arithmetic coding (CABAC) and context-adaptive variable length coding (CAVLC). A video decoder performs inverse operations to reconstruct the encoded video, using the header information and residual information for each of the blocks.

SUMMARY

This disclosure describes techniques for adaptively coding video block header information based on one or more previously encoded video blocks. In particular, a video encoder may adaptively select a coding table for use in encoding a syntax element of a current video block based on the syntax elements of the one or more previously encoded blocks of a coded unit, e.g., a frame or a slice. In one aspect, the video encoder may adaptively select the coding table for use in encoding the block type of the current block based on block types of one or more already coded video blocks adjacent to the current video block, i.e., neighboring video blocks. For example, the video encoder may adaptively select a coding table that associates an Intra 16×16 block type with a shorter codeword than the Intra 4×4 or 8×8 block types when two or more neighboring blocks have Intra 16×16 block types. This may allow the video encoder to more efficiently encode video sequences with a higher resolution, e.g., high-definition (HD) video sequences.

The video encoder may also predict one or more other header syntax elements of the current block based on at least one previously encoded block. If prediction is successful, i.e., the values of the one or more predicted header syntax elements are the same as the values of the actual header syntax elements of the current block, the video encoder may encode a flag (e.g., a 1-bit flag) that indicates the success of prediction instead of separately encoding the values of each of the syntax elements or bundling the syntax elements and encoding them with a longer codeword. A video decoder may also predict the values of the one or more header syntax elements in the same manner as the video encoder, and select the values of the predicted header syntax elements for the block when the encoded flag indicates success of the prediction. Such a technique may further reduce the number of bits used to encode a video block of a sequence of video frames.

In one aspect, a method comprises selecting a coding table to use for encoding a syntax element of a current video block of a coded unit based on a corresponding syntax element of one or more previously encoded video blocks of the coded unit and encoding the syntax element of the current video block using the selected coding table.

In another aspect, an encoding device comprises an encoding unit that includes a selection unit that selects a coding table to use for encoding a syntax element of a current video block of a coded unit based on a corresponding syntax element of one or more previously encoded video blocks of the coded unit and a coding unit that encodes the syntax element of the current video block using the selected coding table.

In another aspect, a computer-readable medium comprises instructions to cause a processor to select a coding table to use for encoding a syntax element of a current video block of a coded unit based on a corresponding syntax element of one or more previously encoded video blocks of the coded unit and encode the syntax element of the current video block using the selected coding table.

In another aspect, an encoding device comprises means for selecting a coding table to use for encoding a syntax element of a current video block of a coded unit based on a corresponding syntax element of one or more previously encoded video blocks of the coded unit and means for encoding the syntax element of the current video block using the selected coding table.

In another aspect, a method of decoding video data comprises selecting a coding table to use for decoding a syntax element of a current video block of a coded unit based on a corresponding syntax element of one or more previously decoded video blocks of the coded unit and decoding the syntax element of the current video block using the selected coding table.

In another aspect, a decoding device comprises a selection unit that selects a coding table to use for decoding a syntax element of a current encoded video block of a coded unit based on a corresponding syntax element of one or more previously decoded video blocks of the coded unit and a decoding unit that decodes the syntax element of the current video block using the selected coding table.

In another aspect, a computer-readable medium comprising instructions to cause a processor to select a coding table to use for decoding a syntax element of a current encoded video block of a coded unit based on a corresponding syntax element of one or more previously decoded video blocks of the coded unit and decode the syntax element of the current video block using the selected coding table.

In another aspect, a decoding device comprises means for selecting a coding table to use for decoding a syntax element of a current encoded video block of a coded unit based on a corresponding syntax element of one or more previously decoded video blocks of the coded unit and means for decoding the syntax element of the current video block using the selected coding table.

The techniques described in this disclosure may be implemented in hardware, software, firmware, or any combination thereof. If implemented in software, the software may be executed in a processor, which may refer to one or more processors, such as a microprocessor, application specific integrated circuit (ASIC), field programmable gate array (FPGA), or digital signal processor (DSP), or other equivalent integrated or discrete logic circuitry. Software comprising instructions to execute the techniques may be initially stored in a computer-readable medium and loaded and executed by a processor.

Accordingly, this disclosure also contemplates computer-readable media comprising instructions to cause a processor to perform any of a variety of techniques as described in this disclosure. In some cases, the computer-readable medium may form part of a computer program product, which may be sold to manufacturers and/or used in a device. The computer program product may include the computer-readable medium, and in some cases, may also include packaging materials.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
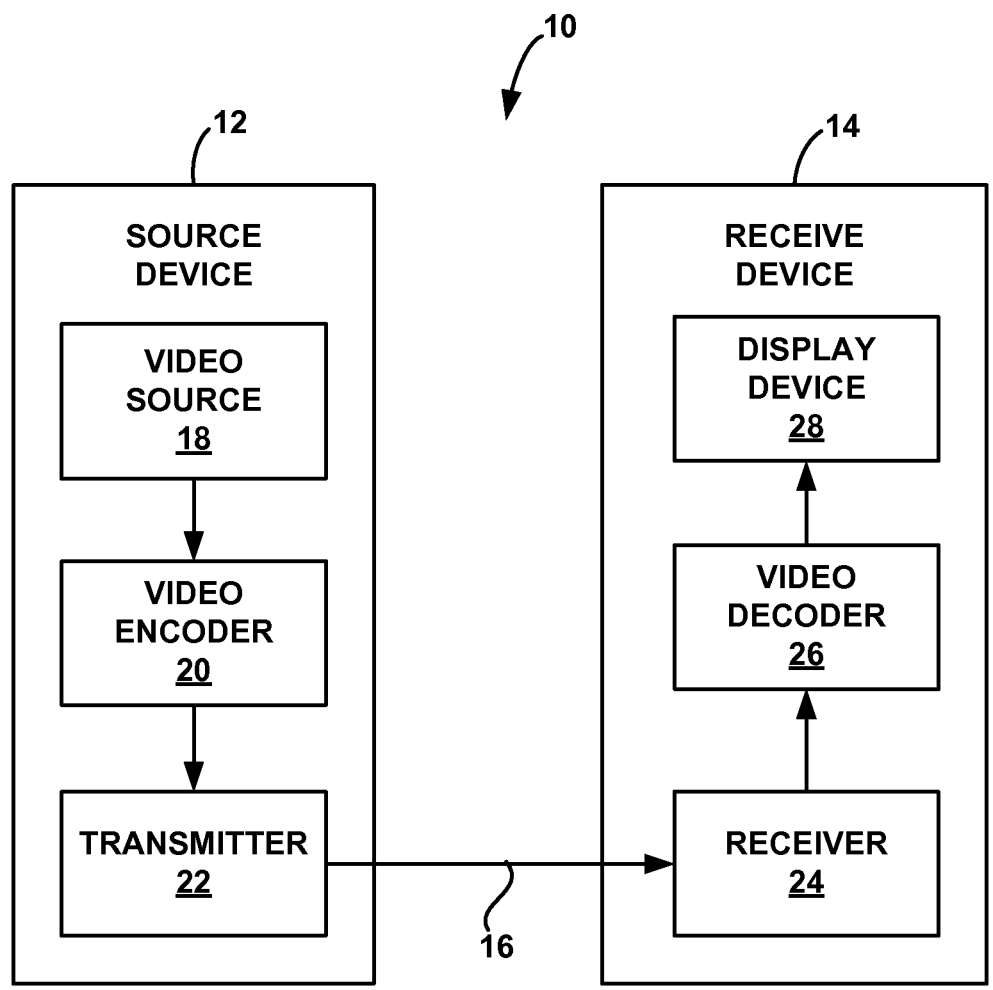
FIG. 1 is a block diagram illustrating a video encoding and decoding system.

FIG. 1 is a block diagram illustrating a video encoding and decoding system 10 that performs the coding techniques described in this disclosure. As shown in FIG. 1, system 10 includes a source device 12 that transmits encoded video data to a receive device 14 via a communication channel 16. Communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting encoded video data from source device 12 to receive device 14.

Source device 12 generates coded video data for transmission to receive device 14. Source device 12 may include a video source 18, a video encoder 20, and a transmitter 22. Video source 18 of source device 12 may include a video capture device, such as a video camera, a video archive containing previously captured video, or a video feed from a video content provider. As a further alternative, video source 18 may generate computer graphics-based data as the source video, or a combination of live video and computer-generated video. In some cases, if video source 18 is a video camera, source device 12 may form a so-called camera phone or video phone. In each case, the captured, pre-captured, or computer-generated video may be encoded by video encoder 20 for transmission from source device 12 to receive device 14 via transmitter 22 and communication channel 16.

Video encoder 20 receives video data from video source 18. The video data received from video source 18 may be a series of video frames. Some of the frames may be divided into slices. Video encoder 20 operates on blocks of pixels (referred to herein as video blocks) within individual video frames in order to encode the video data. A coded unit, such as a frame or slice, may contain multiple blocks. The video blocks may have fixed or varying sizes, and may differ in size according to a specified coding standard. Each video block, often referred to as a macroblock (MB), may be arranged into sub-blocks. As an example, the International Telecommunication Union Standardization Sector (ITU-T) H.264/MPEG-4, Part 10, Advanced Video Coding (AVC) (hereinafter "H.264/MPEG-4 Part 10 AVC" standard) supports intra prediction in various block sizes, such as 16×16, 8×8, or 4×4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components. In general, MBs and the various sub-blocks may be considered to be video blocks. Thus, MBs may be considered to be video blocks, and if partitioned or sub-partitioned, MBs can themselves be considered to define sets of video blocks.

For each of the video blocks, video encoder 20 selects a block type for the block. The term "block type," as used herein, refers to whether the block is predicted using inter-prediction or intra-prediction as well as a partition size of the block. For example, H.264/MPEG-4 Part 10 AVC standard supports a number of inter- and intra-prediction block types including Inter 16×16, Inter 16×8, Inter 8×16, Inter 8×8, Inter 8×4, Inter 4×8, Inter 4×4, Intra 16×16, Intra 8×8, and Intra 4×4. As described in detail below, video encoder 20 may select one of the block types for each of the video blocks based on any of a variety of factors.

For intra-coding, video encoder 20 may select one of the intra-prediction block types based on variation within the current block. When the variation within the current video block is large, e.g., due to high levels of detail or texture, video encoder 20 may select an intra-prediction block type with a smaller block partition such as the Intra 4×4 or Intra 8×8 coding mode. When the variation within the current video block is small, however, video encoder 20 may select an intra-prediction block type with a larger block partition such as the Intra 16×16 block type.

For an intra-coded frame of a video sequence with smaller video resolution, e.g., common image format (CIF) or quarter-CIF (QCIF) video sequence, video encoder 20 typically predicts more video blocks using the Intra 4×4 or Intra 8×8 block types. In the intra-coded frame with a smaller resolution, a 16×16 block may include more variation than a 4×4 or 8×8 block. Thus, a 4×4 or 8×8 block within the frame may be smoother than a 16×16 block within the frame. For example, a 4×4 block of a video sequence may include smooth portion of a scene (e.g., a forehead of a person) whereas a 16×16 block may include more texture (e.g., the forehead, some hair and part of an eye of the person). However, for an intra-coded frame of a video sequence with a high resolution, e.g., high-definition (HD) video sequence, video encoder 20 may predict more blocks using the Intra 16×16 block type than using Intra 4×4 or Intra 8×8 block types. For example, a 4×4 block and a 16×16 block may both include just a forehead of the person because of the high frame resolution and thus may have similar smoothness.

Following intra- or inter-based prediction of the video blocks, video encoder 20 may perform a number of other operations on the video blocks. As will be described in further detail with respect to FIG. 2, these additional operations may include transformation operations (such as 4×4 or 8×8 integer transform used in H.264/MPEG-4 Part 10 AVC or a discrete cosine transformation DCT), quantization operations, and entropy coding operations. Video encoder 20 then encodes each of the blocks of the sequence of video frames and outputs an encoded bitstream. For each block, for example, video encoder 20 may encode header information for the block and residual information for the block. The header information of each block may include a number of syntax elements that identify particular characteristics of the block, such as the selected block type, a prediction mode, a coded block pattern (luma and/or chroma CBP), a motion vector and the like. The residual information of each block quantifies differences between the input video block and one or more prediction blocks.

During entropy encoding, conventional video encoders may bundle a number of header syntax elements together and encode the bundle as a single codeword. For intra-predicted blocks using intra 16×16 prediction in H.264/MPEG-4 Part 10 AVC standard, for example, the conventional video encoder bundles together the block type syntax element, the prediction mode syntax element (e.g., DC, horizontal, vertical, and plane) and coded block pattern syntax elements for luma and chroma (e.g., that indicate whether the quantized transform coefficients for luma and chroma have any non-zero values), and encodes the bundled syntax elements as a single codeword using variable length coding (VLC). In VLC, each possible syntax element to be encoded or combination of syntax elements to be encoded is assigned a codeword. The codewords in VLC vary in length, with the shortest codeword being assigned to the value of a given syntax element that has the highest probability to occur. Conventional video encoders operating in accordance with H.264/MPEG-4 Part 10 AVC standard assign longer codewords to the Intra 16×16 block type than Intra 4×4 and Intra 8×8 block types based on the assumption that the Intra 4×4 and Intra 8×8 block types are selected more frequently than Intra 16×16 block type. Such an assumption may hold true for video sequences with small video resolution, e.g., CIF or QCIF video sequences. However, for video sequences with a high resolution, e.g., HD video sequences, the Intra 16×16 block type may be selected more frequently than the Intra 4×4 or Intra 8×8 block types. This may be especially true when the video sequence includes large smooth regions and quantization is performed with a medium to high quantization parameter (QP). In such video sequences, coding Intra 16×16 block types in accordance with the conventional H.264/MPEG-4 Part 10 AVC standard may be very inefficient. In particular, for HD applications, the longer codewords used for Intra 16×16 block types may be transmitted much more frequently than in non-HD applications, causing excessive bandwidth consumption.

To more efficiently encode video streams that include a large number of video blocks predicted using the Intra 16×16 block type, video encoder 20 performs adaptive header information coding techniques as described in this disclosure. Video encoder 20 may adaptively select a coding table for use in encoding a syntax element of the current video block based on a corresponding syntax element of one or more previously encoded blocks. In one aspect, video encoder 20 may adaptively select the coding table for use in encoding a block type of a current video block based on one or more video blocks adjacent to the current video block, referred to herein as "neighboring video blocks." Video encoder 20 may analyze any number of neighboring blocks at any location in selecting the coding table (also referred to as a codebook) for encoding the block type. For purposes of illustration, however, video encoder 20 will be described, in some aspects, as adaptively selecting the coding table for encoding the block type based on a neighboring block located directly above the current block ("upper neighboring block") and the neighboring block directly to the left of the current block ("left neighboring block").

For an intra-prediction block, for example, video encoder 20 may select a coding table that associates the Intra 4×4 or 8×8 block types with a shorter codeword than the Intra 16×16 block type when the upper neighboring block and the left neighboring block do not both have Intra 16×16 block types. In the H.264/MPEG-4 Part 10 AVC standard, the Intra 16×16 block type is typically represented with codeword "10" while the Intra 4×4 and Intra 8×8 block types are represented with the codeword "0," in which case an additional syntax element transform_size_8x8_flag is coded using 1 bit to indicate whether the block type is Intra 4×4 or Intra 8×8. Video encoder 20 may, however, select a coding table that associates the Intra 16×16 block type with a shorter codeword than the Intra 4×4 or 8×8 block types when the upper neighboring block and the left neighboring block have Intra 16×16 block types. In this case, an entropy coding unit associated with video encoder 20 may encode the block type for the Intra 16×16 block type in the block header using the shorter code word. Video encoder 20 may, for example, select a coding table that represents the Intra 16×16 block type with codeword "0" and represents the Intra 4×4 and 8×8 block types with the codeword "10" when the upper and left neighboring blocks have Intra 16×16 block types. Thus, video encoder 20 operates under the heuristic that, if the upper and left neighboring blocks have Intra 16×16 block types, the probability that the current video block is the Intra 16×16 block type increases. In this manner, video encoder 20 adaptively selects coding tables that more efficiently encode the block types when the Intra 16×16 block type is more frequently used. Although described in the context of selecting coding tables for coding intra-prediction block types, the techniques of this disclosure may also be applied to adaptively select a coding table for inter-prediction block types based on the block types of previously encoded video blocks. Moreover, the techniques of this disclosure may further be applied to adaptively select a coding table for coding other syntax elements of the current video block, such as a prediction mode, a luma CBP, a chroma CBP, a block partition, a motion vector, or the like.

Video encoder 20 may additionally attempt to predict one or more other header syntax elements of the current block based on at least one previously encoded block. For example, video encoder 20 may attempt to predict the prediction mode syntax element and/or the luma/chroma CBP syntax elements of the current block from the previous blocks, e.g., the upper and left neighboring blocks. For example, video encoder 20 may attempt to predict the prediction mode, luma CBP, and chroma CBP and, if prediction is successful, encode a flag that indicates prediction is successful. If prediction of the prediction mode, luma CBP, and chroma CBP is not successful, video encoder 20 may encode each of the syntax elements separately, as described in detail below. Alternatively, video encoder 20 may attempt to predict the prediction mode of the current block from the previous blocks. If prediction is successful, video encoder 20 encodes a flag (e.g., a 1-bit flag) to indicate successful prediction of the prediction mode instead of the 2-bit fixed length codeword of the prediction mode, thus saving at least one bit. Video encoder 20 separately encodes the luma CBP and chroma CBP. If prediction of the prediction mode is unsuccessful, each of the syntax elements is encoded separately.

Source device 12 transmits the encoded video data to receive device 14 via transmitter 22. Receive device 14 may include a receiver 24, video decoder 26, and display device 28. Receiver 24 receives the encoded video bitstream from source device 12 via channel 16. Video decoder 26 decodes the encoded video bitstream to obtain the header information and the residual information of the coded video blocks of the coded unit. Video decoder 26 adaptively selects the coding table (i.e., codebook) to use in decoding the block type of a current video block based on block types of one or more previously decoded blocks. For example, video decoder 26 may adaptively select the coding table that associates the Intra 16×16 block type with a shorter codeword than the Intra 4×4 or 8×8 block types when the upper neighboring block and the left neighboring block have Intra 16×16 block types.

Video decoder 26 may additionally perform prediction of the prediction mode syntax element and/or the luma/chroma CBP syntax elements of the current block in the same manner as video encoder 20. When the encoded bitstream includes a flag indicating that prediction of the prediction mode and luma/chroma CBPs is successful, video decoder 26 uses the predicted prediction mode and luma/chroma CBPs as the syntax elements for the current block. When the flag indicates the prediction of the prediction mode and luma/chroma CBPs failed, video decoder 26 decodes the prediction mode and luma/chroma CBPs from the encoded bitstream. Alternatively, video decoder 26 may attempt to predict the prediction mode of the current block from the previous blocks if video encoder 20 performs such a feature.

Video decoder 26 reconstructs each of the blocks of the slice using the decoded header information and the decoded residual information. Video decoder 26 may use at least a portion of the header information to generate a prediction block for each of the blocks and combine the prediction block of each of the blocks with the corresponding residual information to reconstruct each of the blocks. Receive device 14 may display the reconstructed video blocks to a user via display device 28. Display device 28 may comprise any of a variety of display devices such as a cathode ray tube (CRT), a liquid crystal display (LCD), a plasma display, a light emitting diode (LED) display, an organic LED display, or another type of display unit.

In some cases, source device 12 and receive device 14 may operate in a substantially symmetrical manner. For example, source device 12 and receive device 14 may each include video encoding and decoding components. Hence, system 10 may support one-way or two-way video transmission between devices 12, 14, e.g., for video streaming, video broadcasting, or video telephony.

Video encoder 20 and video decoder 26 may operate according to a video compression standard, such as Moving Picture Experts Group (MPEG)-2, MPEG-4, ITU-T H.263, or ITU-T H.264/MPEG-4 Part 10 AVC. Although not shown in FIG. 1, in some aspects, video encoder 20 and video decoder 26 may each be integrated with an audio encoder and decoder, respectively, and may include appropriate MUX-DEMUX units, or other hardware and software, to handle encoding of both audio and video in a common data stream or separate data streams. In this manner, source device 12 and receive device 14 may operate on multimedia data. If applicable, the MUX-DEMUX units may conform to the ITU H.223 multiplexer protocol, or other protocols such as the user datagram protocol (UDP).

In some aspects, for video broadcasting, the techniques described in this disclosure may be applied to enhanced H.264 video coding for delivering real-time video services in terrestrial mobile multimedia multicast (TM3) systems using the Forward Link Only (FLO) Air Interface Specification, "Forward Link Only Air Interface Specification for Terrestrial Mobile Multimedia Multicast," published in July 2007 as Technical Standard TIA-1099 (the "FLO Specification"). That is to say, communication channel 16 may comprise a wireless information channel used to broadcast wireless video information according to the FLO Specification, or the like. The FLO Specification includes examples defining bitstream syntax and semantics and decoding processes suitable for the FLO Air Interface.

Alternatively, video may be broadcasted according to other standards such as DVB-H (digital video broadcast-handheld), ISDB-T (integrated services digital broadcast-terrestrial), or DMB (digital media broadcast). Hence, source device 12 may be a mobile wireless terminal, a video streaming server, or a video broadcast server. However, techniques described in this disclosure are not limited to any particular type of broadcast, multicast, or point-to-point system. In the case of broadcast, source device 12 may broadcast several channels of video data to multiple receive devices, each of which may be similar to receive device 14 of FIG. 1. Thus, although a single receive device 14 is shown in FIG. 1, for video broadcasting, source device 12 would typically broadcast the video content simultaneously to many receive devices.

In other examples, transmitter 22, communication channel 16, and receiver 24 may be configured for communication according to any wired or wireless communication system, including one or more of a Ethernet, telephone (e.g., POTS), cable, power-line, and fiber optic systems, and/or a wireless system comprising one or more of a code division multiple access (CDMA or CDMA2000) communication system, a frequency division multiple access (FDMA) system, an orthogonal frequency division multiple (OFDM) access system, a time division multiple access (TDMA) system such as GSM (Global System for Mobile Communication), GPRS (General packet Radio Service), or EDGE (enhanced data GSM environment), a TETRA (Terrestrial Trunked Radio) mobile telephone system, a wideband code division multiple access (WCDMA) system, a high data rate 1xEV-DO (First generation Evolution Data Only) or 1xEV-DO Gold Multicast system, an IEEE 802.18 system, a MediaFLO™ system, a DMB system, a DVB-H system, or another scheme for data communication between two or more devices.

Video encoder 20 and video decoder 26 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 20 and video decoder 26 may be included in one or more encoders or decoders, either of which may be integrated as part of a combined encoder/decoder (CODEC) in a respective mobile device, subscriber device, broadcast device, server, or the like. In addition, source device 12 and receive device 14 each may include appropriate modulation, demodulation, frequency conversion, filtering, and amplifier components for transmission and reception of encoded video, as applicable, including radio frequency (RF) wireless components and antennas sufficient to support wireless communication. For ease of illustration, however, such components are summarized as being transmitter 22 of source device 12 and receiver 24 of receive device 14 in FIG. 1.

Figure 2:
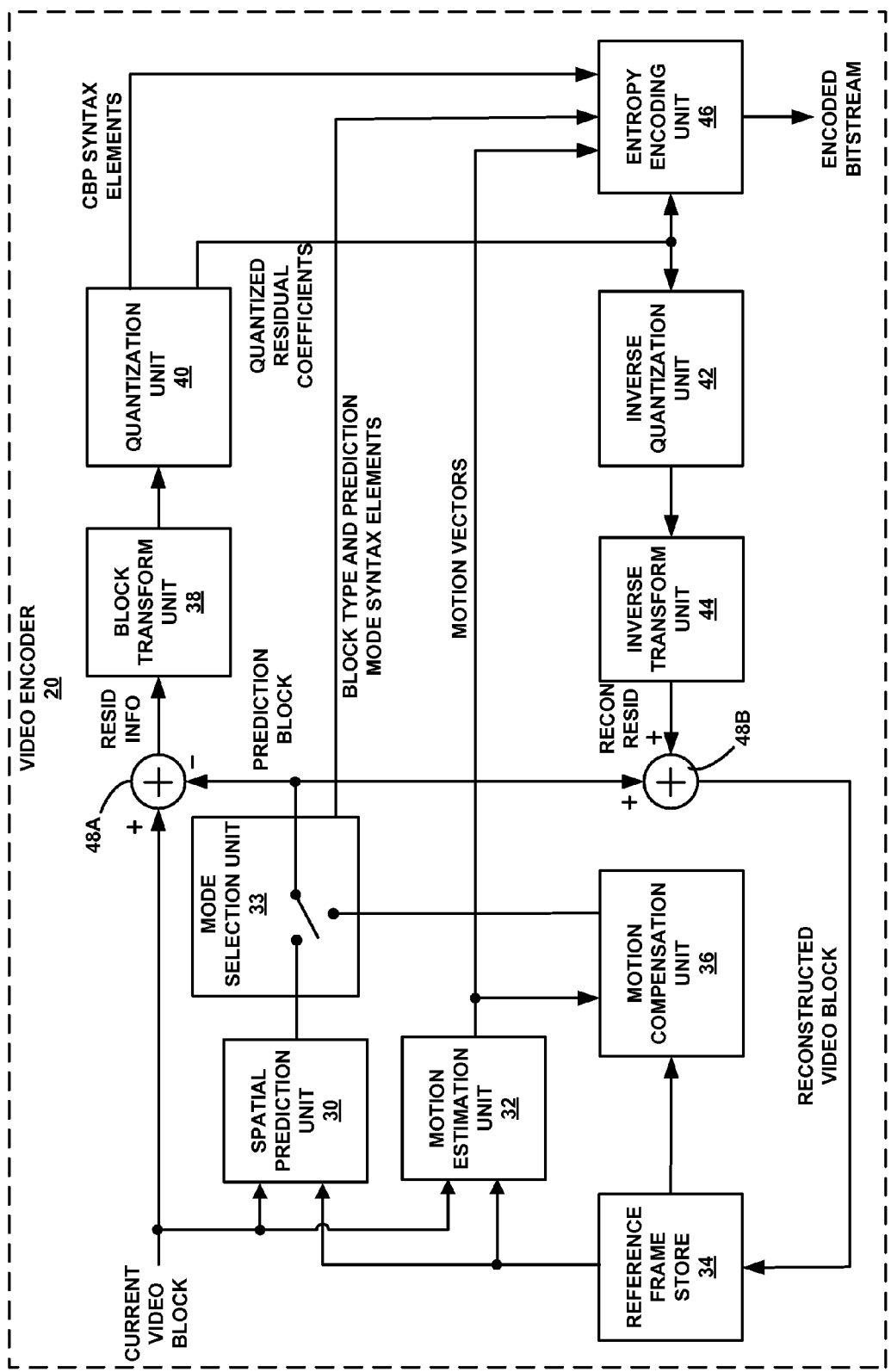
FIG. 2 is a block diagram illustrating an example of a video encoder that performs coding techniques in accordance with this disclosure.

FIG. 2 is a block diagram illustrating an example of a video encoder 20 that performs the coding techniques of this disclosure. Video encoder 20 may correspond to that of source device 12 of FIG. 1. Video encoder 20 performs intra- and inter-coding of blocks within coded units, e.g. video frames or slices. Intra-coding relies on spatial prediction to reduce or remove spatial redundancy in video data within a given video frame, slice or other coded unit. For purposes of illustration, the techniques will be described for a slice of a frame. However, the techniques may be used for any coded unit, such as the entire frame or any portion of the frame. For intra-coding, video encoder 20 forms a prediction block based on one or more previously encoded blocks within the same slice as the block being coded. Inter-coding relies on temporal prediction to reduce or remove temporal redundancy within adjacent frames of a video sequence. For inter-coding, video encoder 20 performs motion estimation to track the movement of matching video blocks between two or more adjacent frames.

As shown in FIG. 2, video encoder 20 receives a current video block within a video frame or slice to be encoded. Video encoder 20 includes components for performing temporal prediction and spatial prediction. In the example of FIG. 2, video encoder 20 includes a spatial prediction unit 30, motion estimation unit 32, mode selection unit 33, reference frame store 34, motion compensation unit 36, block transform unit 38, quantization unit 40, inverse quantization unit 42, inverse transform unit 44 and entropy encoding unit 46. An in-loop deblocking filter (not shown) may be applied to reconstructed video blocks to remove blocking artifacts. Video encoder 20 also includes summers 48A and 48B ("summers 48"). Motion estimation unit 32 and motion compensation unit 36 perform temporal prediction for inter-coding of video blocks. Spatial prediction unit 30 performs spatial prediction for intra-coding of video blocks.

To perform temporal prediction, motion estimation unit 32 compares the current video block to blocks in one or more adjacent video frames to generate one or more motion vectors. The current video block refers to a video block currently being coded, and may comprise input to video encoder 20. The adjacent frame or frames (which include the video blocks to which the current video block is compared) may be retrieved from frame store 34. Frame store 34 may comprise any type of memory or data storage device to store one or more previously encoded frames or blocks. In this case, frame store may store blocks within the previously encoded frames. Motion estimation unit 32 identifies a block in an adjacent frame that most closely matches the current video block, e.g., a block in the adjacent frame that has a smallest mean squared error (MSE), sum of squared difference (SSD), sum of absolute difference (SAD), or has the smallest rate-distortion cost. Motion estimation may be performed for blocks of variable sizes, e.g., 16×16, 16×8, 8×16, 8×8 or smaller block sizes, based on the block type of the current video block.

Motion estimation unit 32 produces a motion vector (MV) (or multiple MV's in the case of bidirectional prediction) that indicates a magnitude and trajectory of the displacement between the current video block and the identified predictive block used to code the current video block. Motion vectors may have half- or quarter-pixel precision, or even finer precision, allowing video encoder 20 to track motion with higher precision than integer pixel locations and obtain a better prediction block. Using the resulting motion vector, motion compensation unit 36 forms a prediction video block by motion compensation. In the case of integer pixel precision, motion compensation unit 36 selects the block at the location identified by the motion vector as the prediction block. In the case of fractional pixel precision, motion compensation unit 36 may perform interpolation to form the prediction block.

In the case of spatial prediction, spatial prediction unit 30 generates a prediction block based on one or more adjacent blocks within a common frame. Spatial prediction unit 30 may, for example, generate the prediction block by performing interpolation using one or more adjacent blocks within the current frame and a selected prediction mode. The one or more adjacent blocks within the current frame may, for example, be retrieved from frame store 34. Thus, in the case of spatial prediction, frame store 34 may store previously encoded blocks of the current frame that have been decoded and reconstructed. For an intra 16×16 block type, for example, spatial prediction unit 30 may generate the prediction block using one of four prediction modes; a DC prediction mode, a horizontal prediction mode, a vertical prediction mode and a plane prediction mode. As another example, spatial prediction unit 30 may select one of the adjacent blocks within the current frame as the prediction block. In this manner, spatial prediction unit 30 relies on blocks within a common frame to generate the prediction block instead of blocks within adjacent frames.

Mode selection unit 33 selectively switches between the prediction block generated by spatial prediction unit 30 and the prediction block generated by motion compensation unit 36 based on the coding mode selected to encode the current block. In this manner, video encoder 20 may selectively perform inter-coding and intra-coding, e.g., on a frame-by-frame or block-by-block basis. Video encoder 20 generates residual information (labeled "RESID INFO" in FIG. 2) by subtracting the selected prediction block produced from the current video block at summer 48A. Thus, in the case of intra-coding, video encoder 20 generates the residual information by subtracting the selected prediction block output by spatial prediction unit 30 from the current video block at summer 48A. In the case of inter-coding video encoder 20 generates the residual information by subtracting the selected prediction block output by motion compensation unit 36 from the current video block at summer 48A. As described above, the residual information quantifies the differences between the prediction video block and the current video block being coded. Block transform unit 38 applies a transform, such as a DCT or a 4×4 or 8×8 integer transform, to the residual information to produce residual transform coefficients. Quantization unit 40 quantizes the residual transform coefficients to further reduce the bit rate.

Following quantization, inverse quantization unit 42 and inverse transform unit 44 may apply inverse quantization and inverse transformation, respectively, to reconstruct the residual information (labeled "RECON RESID" in FIG. 2). Summer 48B adds the reconstructed residual information to the prediction block produced by motion compensation unit 36 or spatial prediction unit 30 to produce a reconstructed video block for storage in frame store 34. The reconstructed video block may be used by motion estimation unit 32 and motion compensation unit 36 to inter-code a block in a subsequent video frame. Additionally, the reconstructed block may be used by spatial prediction unit 30 to intra-code another block in the current frame.

Entropy encoding unit 46 receives residual information in the form of quantized residual coefficients for the current video block from quantization unit 40. Additionally, entropy encoding unit 46 receives block header information for the current video block in the form of one or more header syntax elements from the mode selection unit 33 and other components within video encoder 20. The header syntax elements may identify particular characteristics of the current video block. For a block being intra-coded, for example, entropy encoding unit 46 may receive a block type syntax element and a prediction mode syntax element from the mode selection unit 33, and CBP syntax elements for luma and chroma from the quantization unit 40. For a block being inter-coded, entropy encoding unit 46 may additionally receive one or more motion vectors as syntax elements for the current video block from the motion estimation unit 32. The syntax elements described above are examples of the syntax elements that may be received by entropy encoding unit 46. Entropy encoding unit 46 may receive more or fewer syntax elements.

Entropy encoding unit 46 encodes the header information and the residual information for the current video block to generate an encoded bitstream. Entropy encoding unit 46 encodes the header information of each of the blocks in accordance with the techniques described in this disclosure. In particular, entropy encoding unit 46 adaptively selects a coding table for use in encoding a syntax element of each of the blocks based on the corresponding syntax elements of previously encoded blocks. In other words, entropy encoding unit 46 adaptively selects the coding table on a block by block basis based on syntax elements of previously encoded blocks. Thus, entropy encoding unit 46 may select a first coding table for a first block of a frame and a second coding table for a second block of the frame based on the syntax elements of one or more previously encoded blocks. In some instances, the previously encoded blocks used in making the selection have been encoded using a coding table different from the selected coding table.

In one aspect, entropy encoding unit 46 may adaptively select the coding table for use in encoding intra-prediction block types based on one or more video blocks adjacent to the current video block, i.e., neighboring video blocks. In another aspect, entropy encoding unit 46 may select the coding table based on a percentage of previously encoded blocks that have Intra 16×16 block types. For purposes of illustration, however, entropy encoding unit 46 will be described as adaptively selecting the coding table for encoding the intra-prediction block type based on a neighboring block located directly above the current block ("upper neighboring block") and the neighboring block directly to the left of the current block ("left neighboring block"). However, entropy encoding unit 46 may analyze any number of neighboring blocks at any location in selecting the coding mode table for encoding. Moreover, entropy encoding unit 46 may use similar techniques to adaptively select a coding table for inter-prediction block types based on the block types of previously encoded video blocks. Additionally, the techniques of this disclosure may further be applied to adaptively select a coding table for coding other syntax elements of the current video block, such as a prediction mode, a luma CBP, a chroma CBP, a block partition, a motion vector, or the like.

Entropy encoding unit 46 may select a coding table that associates the Intra 4×4 or 8×8 block types with a shorter codeword than the Intra 16×16 block type when the upper neighboring block and the left neighboring block do not both have Intra 16×16 block types. Entropy encoding unit 46 may, for example, select a coding table that associates the Intra 4×4 and Intra 8×8 block type with the codeword "0" (i.e., a one-bit codeword) and associates the Intra 16×16 block type with codeword "10" (i.e., a two-bit codeword), e.g., in accordance with the H.264/MPEG-4 Part 10 AVC standard. Entropy encoding unit 46 may select a coding table that associates the Intra 16×16 block type with a shorter codeword than the Intra 4×4 or 8×8 block types when the upper neighboring block and the left neighboring block both have Intra 16×16 block types. In one example, the selected coding table may associate the Intra 16×16 block type with codeword "0" (i.e., a one-bit codeword) and associate the Intra 4×4 and 8×8 block types with the codeword "10" (i.e., a two-bit codeword) when the upper and left neighboring blocks have Intra 16×16 block types. Thus, entropy encoding unit 46 operates under the heuristic that, if the upper and left neighboring blocks have Intra 16×16 block types, the probability that the current video block is the Intra 16×16 block type increases. In some cases the current block may not be an Intra 16×16 block type and the adaptively selected coding table may result in a longer codeword being used for Intra 8×8 or 4×4 block type. However, more often than not the heuristic is true, resulting in saving of bits to encode the Intra 16×16 block type. In this manner, video encoder 20 adaptively selects coding tables that more efficiently encode the blocks when the Intra 16×16 block type is more frequently used.

Entropy encoding unit 46 may also predict one or more other syntax elements of the current block based on at least one previously encoded block to attempt to further reduce the number of bits used to encode the block header syntax elements. For example, entropy encoding unit 46 may attempt to predict together the prediction mode syntax element and the luma/chroma CBP syntax elements of the current block from the previous blocks, e.g., the upper and left neighboring blocks. For example, entropy encoding unit 46 may predict the prediction mode and the luma/chroma CBPs of the current block to be the prediction mode and the luma/chroma CBP of one of the neighboring blocks when at least one of the neighboring blocks has an Intra 16×16 block type. Entropy encoding unit 46 compares the prediction mode and luma/chroma CBP of the current block to the predicted prediction mode and luma/chroma CBP, and if prediction is successful, i.e., they are the same, entropy encoding unit 46 encodes a flag that indicates prediction is successful. Entropy encoding unit 46 thus bundles the prediction mode and luma/chroma CBP and represents them using the flag (e.g., a 1-bit flag) instead of encoding each syntax element separately, resulting in a further reduction in the number of bits used to encode the syntax elements.

If prediction of the prediction mode, luma CBP, and chroma CBP is not successful, entropy encoding unit 46 sets the flag to indicate failure of the prediction. Entropy encoding unit 46 may attempt to predict only the prediction mode of the current block from the previous blocks. For example, entropy encoding unit 46 may predict the prediction mode of the current block to be the prediction mode of one of the neighboring blocks when at least one of the neighboring blocks has an Intra 16×16 block type. Entropy encoding unit 46 compares the prediction mode of the current block to the predicted prediction mode, and if prediction is successful, i.e., they are the same, entropy encoding unit 46 encodes a prediction mode flag (e.g., a 1-bit prediction mode flag) that indicates prediction is successful. If prediction is successful, a 1-bit prediction mode flag is sent instead of the 2-bit fixed length codeword of the prediction mode, thus saving at least one additional bit. Entropy encoding unit 46 encodes the luma CBP and chroma CBP separately. If prediction of the prediction mode is also unsuccessful or entropy encoding unit 46 does not attempt to predict the prediction mode, entropy encoding unit 46 encodes each of the syntax elements using separate codebooks without coding additional flags to indicate whether prediction is successful.

Entropy encoding unit 46 may operate in accordance with the example pseudo code below to perform the intra-coding techniques in accordance with one aspect of this disclosure.

```
Encode I16MBtype(currMB)
{
    Let upI16 be equal to 1 if up MB type is I6;
    Let leftI16 be equal to 1 if left MB type is I6;
    If (upI16 = 1 && leftI16 = 1)
                code currMBType using codewords {"0", "10",
"11"} for {I16, I4/8, IPCM};
    Else
                code currMBType using codewords {"0", "10",
            "11"} for {I4/8, I16, IPCM};
    //the following code predicts I16mode/CBPs of currMB
    {
    upValue = upI16 ? I16value(upMB) : 0;
    leftValue = leftI16 ? I16value(leftMB) : 0;
    If (upI16 && leftI16)
                predValue = min(upValue, leftValue);
    Else if (upI16)
                predValue = upValue;
    Else if (leftI16)
                predValue = leftValue;
    Else
                predValue = -1;
    currValue = I16value(currMB);
    If (predValue == -1)
    {
            send currPredMode in 2-bit FLC
            send currLumaCBP in 1-bit FLC
            send currChromaCBP using codewords {0, 10, 11}
    }
    Else If (currValue == predValue)
            send flag "1"
    Else
    {
            send flag "0"
            send currPredMode in 2-bit FLC
            send currLumaCBP in 1-bit FLC
            send currChromaCBP using codewords {0, 10, 11}
        }
    }
}
Int I16value(thisMB)
{
    Let thisPredMode be the prediction mode of thisMB
    Let thisLumaCBP be the luma CBP of thisMB
    Let this ChromaCBP be the chroma CBP of thisMB
    return thisPredMode + (thisLumaCBP<<4) +
    (thisChromaCBP<<2);
}
```

Initially, entropy encoding unit 46 sets the variable upI16 to "1" if the upper neighboring block has an Intra 16×16 block type and sets the variable upI16 to "0" if the upper neighboring block has an Intra 16×16 block type. Likewise, entropy encoding unit 46 sets the variable leftI16 equal to "1" if the left neighboring block has an Intra 16×16 block type and sets the variable leftI16 to "0" if the left neighboring block has an Intra 16×16 block type.

Entropy encoding unit 46 selectively encodes the block type of the current block based on the block types of the upper and left neighboring blocks. In particular, entropy encoding unit 46 encodes the block type of the current block (i.e., currMBtype) using codewords "0", "10", and "11" for Intra 16×16 (I16), Intra 4×4 or 8×8 (I4/8), and raw pixel data (IPCM), respectively, when both the upI16 and leftI16 are equal to "1". Thus, the variable length codeword assigned to the Intra 16×16 (I16) block type is shorter than the variable length codeword assigned to the Intra 4×4 or 8×8 block types (I4/8) or the raw pixel data (IPCM) block type. When upI16, leftI16, or both have a block type other than Intra 16×16, entropy encoding unit 46 encodes the block type of the current block (i.e., currMBtype) using codewords "0", "10", "11" for block types I4/8, I16, IPCM, respectively.

Although in the example pseudo code described above, entropy encoding unit 46 selects the coding tables to use in encoding the block type of the current block based on the upper and left neighboring blocks, entropy encoding unit 46 may analyze more neighboring blocks in making the selection. Moreover, entropy encoding unit 46 may select the coding tables to use in encoding based on other criteria, e.g., a percentage of previously encoded blocks that have an Intra 16×16 block type. For example, entropy encoding unit 46 may select the coding table that has the shorter codeword associated with the Intra 16×16 block type when at least 10 of the last 20 previously encoded blocks have Intra 16×16 block types.

To predict the prediction mode and the CBPs (luma and chroma), entropy encoding unit 46 initializes variables upvalue and leftValue. Variables upvalue and leftValue are the values of the prediction mode and CBPs (luma and chroma) for the upper neighboring block and the left neighboring block, respectively. Entropy encoding unit 46 sets upvalue equal to "0" when upI16 is not equal to "1", i.e., when the upper neighboring block does not have an Intra 16×16 block type. When upI16 is equal to "1", i.e., the upper neighboring block has an Intra 16×16 block type, entropy encoding unit 46 computes upValue using the I16value function. The I16value function returns a value in which the least significant two bits correspond with a prediction mode of the upper neighboring block, the next two significant bits correspond with a chroma CBP of the upper neighboring block, and the next bit corresponds with the luma CBP of the upper neighboring block. Entropy encoding unit 46 determines leftValue in a similar manner to upValue. In particular, entropy encoding unit 46 sets leftValue equal to "0" when leftI16 is not equal to "1" and sets leftValue equal to the value returned from the I16value function when leftI16 is equal to "1".

Entropy encoding unit 46 predicts the value of the prediction mode and CBP values for the current block (predValue)

based on the block types of the neighboring blocks and the values of the prediction mode and the CBPs of the neighboring blocks, i.e., upvalue and leftValue. If both upI16 and leftI16 are equal to "1", i.e., both neighboring blocks have Intra 16×16 block types, entropy encoding unit 46 sets pred-Value equal to the minimum of upValue and leftValue. Although in the example pseudo code entropy encoding unit 46 sets predValue equal to the minimum of up Value and leftValue, entropy encoding unit 46 may set predValue equal to a maximum of upValue and leftValue or a combination the two values.

When both neighboring blocks do not have Intra 16×16 block types, entropy encoding unit 46 sets predValue equal to upValue if only upI16 is equal to "1" or sets predValue equal to leftValue if only leftI16 is equal to "1". In this manner, entropy encoding unit 46 predicts the value of the prediction mode and CBP values for the current block (predValue) using the prediction mode and CBP values for the neighboring block that has an Intra 16×16 block type. If neither upI16 or leftI16 is equal to "1", i.e., neither of the neighboring block types is Intra 16×16, entropy encoding unit 46 sets predValue equal to "−1". Setting predValue equal to "−1" indicates that there is no neighboring block to use for predicting the value of the prediction mode and CBP values for the current block (predValue).

Entropy encoding unit 46 then computes the value of the prediction mode and CBPs for the current block (currValue) using the I16value function. After computing currValue, entropy encoding unit 46 encodes the prediction mode and CBPs of the current block based on a comparison of currValue and predValue. If predValue is equal to "−1", i.e., there is no neighboring block to use for prediction, entropy encoding unit 46 encodes the prediction mode of the current block (currPredMode) using a 2-bit fixed length code, encodes the luma CBP (currLumaCBP) using a 1-bit fixed length code, and encodes the chroma CBP (currChromaCBP) using variable length codewords {0, 10, 11}.

The 2-bit fixed length codes for currPredMode correspond with one of the four prediction modes. For example, the vertical prediction mode may correspond to code "00," the horizontal prediction mode may correspond to "01," the DC prediction mode may correspond to "10" and the plane prediction mode may correspond to "11." The 1-bit fixed length code for currLumaCBP indicates whether there are any non-zero luma coefficients. For example, a currLumaCBP of "0" indicates that there are no non-zero luma coefficients and a currLumaCBP of "1" indicates that there is at least one non-zero luma coefficient. The variable length codewords for the currChromaCBP indicate whether there are any non-zero chroma coefficients. For example, a currChromaCBP value of "0" indicates that all chroma AC and DC coefficients are zero, a currChromaCBP value of "10" indicates that there is at least one non-zero chroma DC coefficient but no non-zero chroma AC coefficients, and a currChromaCBP value of "11" indicates that there is at least one non-zero chroma DC coefficient and at least one non-zero chroma AC coefficient.

If predValue is not equal to "−1", entropy encoding unit 46 determines whether currValue is equal to predValue, and if so, sends a 1-bit flag that is set equal to "1" to indicate that prediction is successful. Entropy encoding unit 46 may not send any other information regarding the prediction mode or the luma/chroma CBPs for this video block. Instead, the 1-bit flag indicates to the decoder that the prediction value (predValue) is correct, thus enabling the decoder to use the prediction mode and the luma/chroma CBPs predicted by the decoder in a similar manner as described above. In this manner, entropy encoding unit 46 bundles the prediction mode and the luma/chroma CBPs together by sending the 1-bit flag set equal to "1". Sending the 1-bit flag to indicate that the prediction of the prediction mode and the CBP values is successful reduces the number of bits that need to be encoded for the header information.

If predValue is not equal to "−1" and not equal to the currValue, entropy encoding unit 46 sets the 1-bit flag equal to "0" to indicate to the decoder that the prediction failed, i.e., currValue is not equal to the predValue. Following the 1-bit flag, entropy encoding unit 46 encodes the prediction mode of the current block (currPredMode) using a 2-bit fixed length code, encodes the luma CBP (currLumaCBP) using a 1-bit fixed length code, and encodes the chroma CBP (currChromaCBP) using variable length codewords {0, 10, 11} as described in detail above. Thus, in this case, the prediction mode and the coded block patterns (CBPs) are sent separately instead of being bundled together.

In a further aspect of this disclosure, when prediction of the prediction mode and luma/chroma CBPs fails, i.e., currValue is not equal to predValue, entropy encoding unit 46 may attempt to predict the prediction mode of the current block from the prediction mode of one or more neighboring blocks. In other words, entropy encoding unit 46 may attempt to predict the prediction mode without also trying to predict the luma and chroma CBPs. Example pseudo code for predicting the prediction mode is provided below.

```
PredI16mode(currMB)
{
    Let upMode be the prediction mode of the neighboring block directly
above the current block;
    Let leftMode be the prediction mode of the neighboring block
    directly to the left of the current block;
    If(upI16 && leftI16)
        predMode = min(upMode, leftMode);
    Else if(upI16)
        predMode = upMode;
    Else if(leftI16)
        predMode = leftMode;
    Else
      predMode = −1;
    Let currPredMode be the I16 prediction mode for currMB
    If(predMode == −1)
        send currPredMode using 2-bit FLC
    Else If(currPredMode == predMode)
        send flag "1"
    Else
    {
        send flag "0"
        send currPredMode using codewords {0, 10, 11}
    }
}
```

Entropy encoding unit 46 may initialize variables upMode and leftMode to be equal to the prediction mode of the neighboring block directly above the current block and directly to the left of the current block, respectively. Entropy encoding unit 46 predicts the prediction mode of the current block (predMode) based on one or more neighboring blocks. If both upI16 and leftI16 are equal to "1", i.e., both neighboring blocks have Intra 16×16 block types, entropy encoding unit 46 sets predMode as the minimum of upMode and leftMode. Entropy encoding unit 46 may use the maximum of upMode and leftMode or a combination of the two instead of the minimum. If both neighboring blocks are not Intra 16×16 block types, entropy encoding unit 46 sets predMode to be equal to the prediction mode of the upper neighboring block (upMode) if upI16 is equal to "1" or sets predMode to be equal to the prediction mode of the left neighboring block if leftI16 is equal to "1". If neither upI16 or leftI16 is equal to "1", entropy encoding unit 46 sets predMode equal to "−1", which indicates that there is no Intra 16×16 neighboring blocks that can be used to predict the prediction mode of the current block.

Entropy encoding unit 46 encodes the prediction mode of the current block (currPredMode) based on the predicted prediction mode (predMode). If predMode is equal to "−1", entropy encoding unit 46 encodes currPredMode using a 2-bit fixed length code that corresponds with one of four possible prediction modes. Additionally, entropy encoding unit 46 encodes the luma CBP (currLumaCBP) using a 1-bit fixed length code and the chroma CBP (currChromaCBP) using variable length codewords {0, 10, 11} as described above. If predMode is not equal to "−1", entropy encoding unit 46 determines whether currPredMode is equal to predMode, and if so, sends a 1-bit flag that is equal to "1". Entropy encoding unit 46 may not send any other information regarding the prediction mode of the current block. Instead, the 1-bit flag indicates to the decoder that prediction of the prediction mode was successful. The decoder may therefore use the predicted prediction mode (predMode) as the prediction mode of the current block. Entropy encoding unit 46 may still encode currLumaCBP using a 1-bit fixed length code and encode currChromaCBP using variable length codes {0, 10, 11}. Thus, successful prediction of the current prediction mode may result in a reduction of the number of bits needed to code the current block, even when prediction of the bundle of the prediction mode, luma CBP and chroma CBP fails.

If predMode is not equal to "−1" or currPredMode, entropy encoding unit 46 sets the 1-bit flag equal to "0" to indicate to the decoder that the prediction of the prediction mode failed, i.e., that currPredMode is not equal to predMode. Following the 1-bit flag, entropy encoding unit 46 encodes the prediction mode of the current block (currPredMode) using codewords {0, 10, 11}. Because the currPredMode is not equal to predMode, there only are three other possible prediction modes remaining. Thus, entropy encoding unit 46 may encode currPredMode using the variable length codewords {0, 10, 11}. Entropy encoding unit 46 also encodes the currLumaCBP and currChromaCBP as described in detail above.

Figure 3:
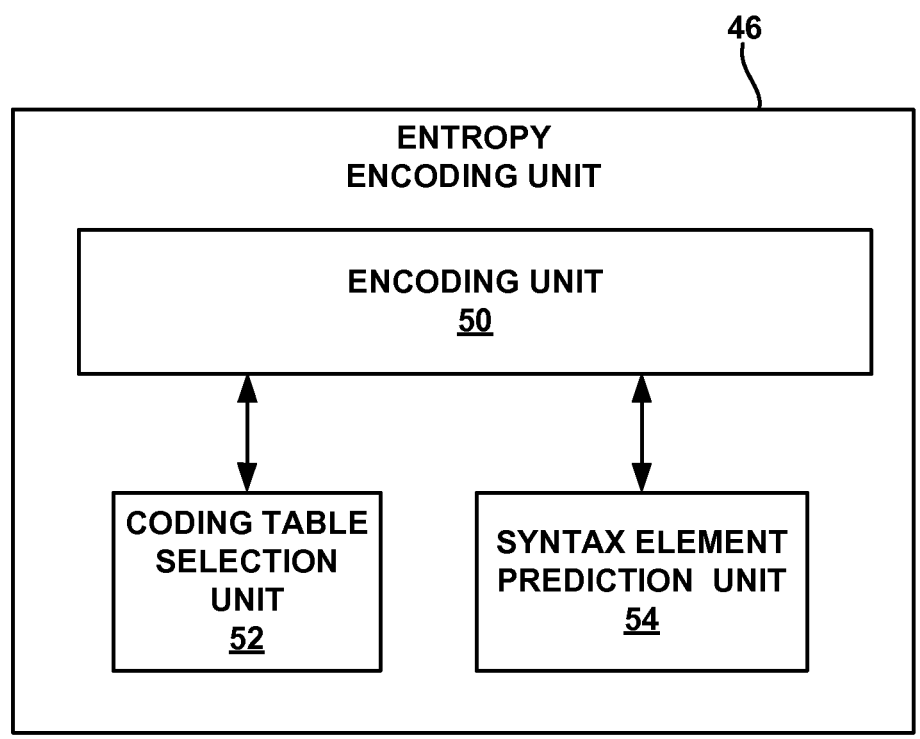
FIG. 3 is a block diagram illustrating an example entropy encoding unit of the video encoder of FIG. 2 in further detail.

FIG. 3 is a block diagram illustrating an example entropy encoding unit 46 configured to encode video blocks in accordance with an aspect of the disclosure. Entropy encoding unit 46 may reside within video encoder 20 of FIGS. 1 and 2. Entropy encoding unit 46 receives block data for a block and generates an encoded bitstream for transmission to another device for decoding. In the example of FIG. 3, entropy encoding unit 46 includes an encoding unit 50, a coding table selection unit 52, and a syntax element prediction unit 54.

Encoding unit 50 encodes the block data for the block using one or more coding tables. Encoding unit 50 may obtain the coding tables to use for encoding from coding table selection unit 52. Coding table selection unit 52 may store a number of coding tables to encode different types of data. For example, coding table selection unit 52 may store one or more coding tables for encoding residual information, one or more coding tables for encoding each type of header syntax element, one or more coding tables for encoding bundles of header syntax elements, and the like. In some instances, coding table selection unit 52 may not store the coding tables, but instead retrieve the correct coding table from storage external to entropy encoding unit 46.

Coding table selection unit 52 may adaptively select a coding table for use by encoding unit 50 in encoding a block type syntax element of the current block based on the block types of previously encoded blocks. In one aspect, coding table selection unit 52 may adaptively select the coding table for use in encoding the block type of the current block based on one or more neighboring video blocks, e.g., based on an upper and left neighboring block as described in detail above. Coding table selection unit 52 may, for example, select a first coding table that associates the Intra 4×4 or 8×8 block types with a shorter codeword than the Intra 16×16 block type when the upper neighboring block and the left neighboring block do not both have Intra 16×16 block types and select a second coding table that associates the Intra 16×16 block type with a shorter codeword than the Intra 4×4 or 8×8 block types when the upper neighboring block and the left neighboring block both have Intra 16×16 block types. In another aspect, coding table selection unit 52 may select the coding table based on a percentage of previously encoded blocks that have Intra 16×16 block types. Encoding unit 50 encodes the block type syntax element of the current block in accordance with the selected coding table.

In some instances, syntax element prediction unit 54 may attempt to predict one or more other syntax elements of the current block based on the previously encoded blocks. For an intra-prediction block, for example, syntax element prediction unit 54 may attempt to predict the prediction mode syntax element and the luma/chroma CBP syntax elements of the current block, and/or attempt to predict the prediction mode syntax element of the current block without predicting the luma/chroma CBP syntax elements. Syntax element prediction unit 54 may predict the prediction mode and the luma/chroma CBPs of the current block to be the prediction mode and the luma/chroma CBP of one of the neighboring blocks when at least one of the neighboring blocks has an Intra 16×16 block type.

Encoding unit 50 receives the predicted syntax elements from syntax element prediction unit 54 and compares the predicted syntax elements with the actual syntax elements of the current block. If prediction is successful, i.e., the predicted and actual syntax elements are the same, encoding unit 50 encodes a flag that indicates prediction of the syntax elements, e.g., prediction mode and the luma/chroma CBP in the example above, was successful. Encoding unit 50 thus bundles the prediction mode and luma/chroma CBP and represents them using the flag (e.g., a 1-bit flag) instead of encoding each syntax element separately, resulting a further reduction in the number of bits used to encode the syntax elements.

If prediction of the prediction mode, luma CBP, and chroma CBP (or other syntax element) is not successful, encoding unit 50 encodes the flag to indicate failure of the prediction. If prediction of prediction mode and luma/chroma CBPs is unsuccessful, syntax element prediction unit 54 may attempt to predict the prediction mode of the current block from the previous blocks without predicting the luma/chroma CBPs. For example, syntax element prediction unit 54 may predict the prediction mode of the current block to be the prediction mode of one of the neighboring blocks when at least one of the neighboring blocks has an Intra 16×16 block type.

Encoding unit 50 compares the prediction mode of the current block to the predicted prediction mode received from syntax prediction unit 54, and if prediction is successful, encoding unit 50 encodes a flag that indicates prediction of the prediction mode was successful. Encoding unit 50 encodes the luma CBP and chroma CBP separately using respective coding tables associated with those syntax elements. If prediction of the prediction mode is also unsuccessful or there is no attempt to predict the prediction mode, encoding unit 50 encodes each of the syntax elements separately using respective coding tables retrieved from coding table selection unit 52.

Figure 4:
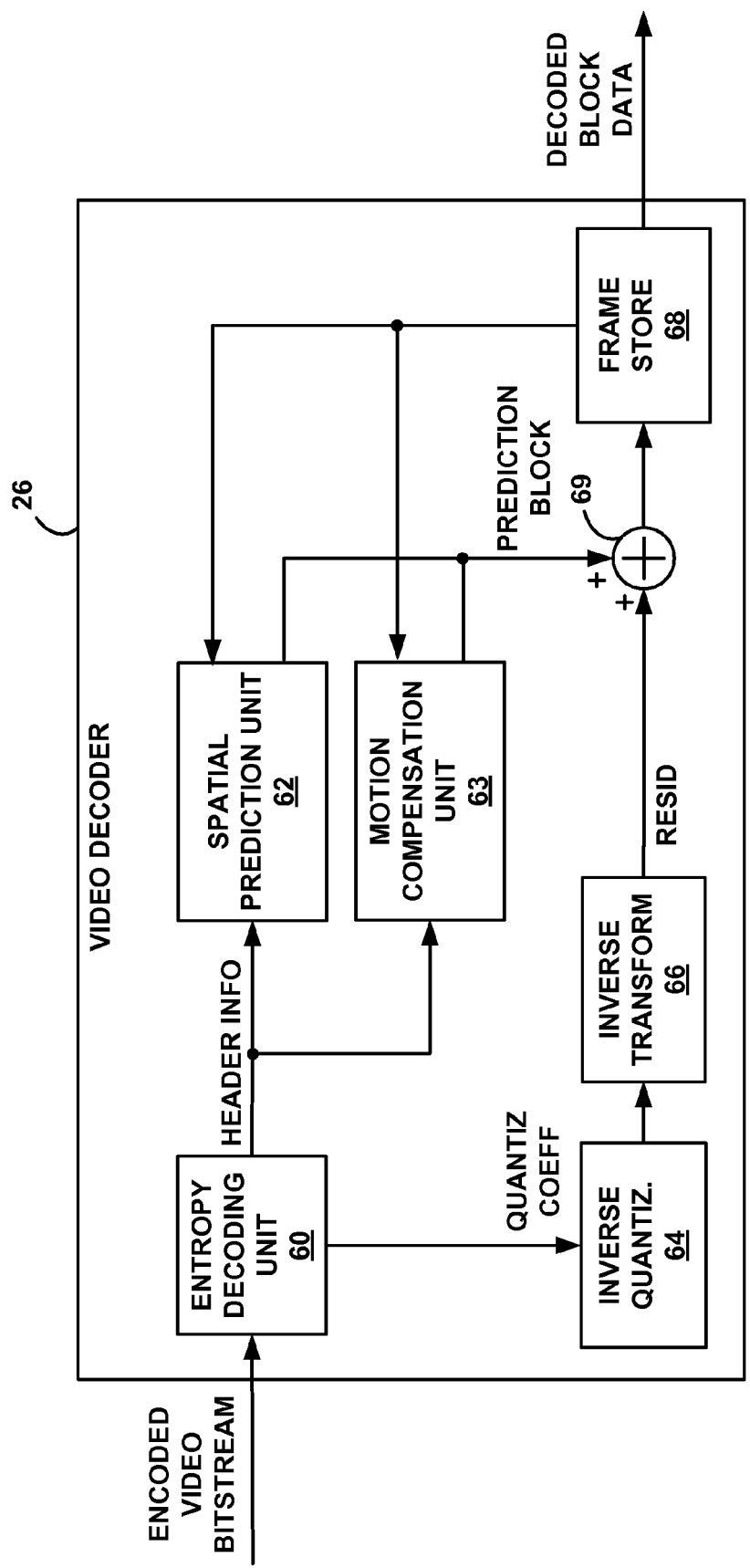
FIG. 4 is a block diagram illustrating an example of a video decoder that decodes video data in accordance with coding techniques described in this disclosure.

FIG. 4 is a block diagram illustrating an example of a video decoder 26 that decodes video data in accordance with the coding techniques of this disclosure. Video decoder 26 may, for example, correspond to that of receive device 14 of FIG. 1. Video decoder 26 may perform intra- and inter-decoding of blocks within video frames. In the example of FIG. 4, video decoder 26 includes an entropy decoding unit 60, spatial prediction unit 62, motion compensation unit 63, inverse quantization unit 64, inverse transform unit 66, and frame store 68. Video decoder 26 also includes summer 69, which combines the output of inverse transform unit 66 and, depending on whether the video block is inter-coded or intra-coded, the output of either motion compensation unit 63 or spatial prediction unit 62, respectively. FIG. 4 illustrates the spatial prediction components of video decoder 26 for intra-decoding of video blocks.

Entropy decoding unit 60 receives the encoded video bitstream and decodes the encoded bitstream to obtain residual information (e.g., in the form of quantized residual coefficients) and header information (e.g., in the form of one or more header syntax elements). As described in detail above, entropy encoding unit 46 (FIG. 2) adaptively selects coding tables (e.g., codebooks) to use in encoding block types based on block types of previously encoded blocks. Entropy decoding unit 60 therefore may adaptively select a coding table for use in decoding block types in a similar manner to entropy encoding unit 46 to correctly decode the block types of the current block.

In one aspect, entropy decoding unit 60 adaptively selects the coding table for decoding the block type of the current block based on one or more neighboring blocks of the current slice, i.e., adjacent video blocks. For video block with no previously encoded adjacent video blocks, such as for the first video block of a frame, entropy decoding unit 60 may select a default coding table. The default coding table may, for example, be the coding table that assigns a shorter codeword to Intra 4×4 and 8×8 block types than the codeword assigned to Intra 16×16 block type. For video blocks within the slice for which previously decoded adjacent video blocks exist, entropy decoding unit 60 may analyze any number of neighboring blocks at any location in selecting the coding table for decoding. For purposes of illustration, however, entropy decoding unit 60 will be described as adaptively selecting the coding table for decoding the block type of a block based on an upper neighboring block and a left neighboring block.

In the case of intra-prediction block types, for example, entropy decoding unit 60 may select the coding table that associates a shorter codeword with the Intra 16×16 block type than the Intra 4×4 or 8×8 block types when both the upper neighboring block and the left neighboring block have Intra 16×16 block types. The coding table selected when both the upper and left neighboring block have Intra 16×16 block types may, for example, associate codewords "0", "10", and "11" to the Intra 16×16 block type, the Intra 4×4 or 8×8 block types, and the raw pixel data block type (IPCM), respectively. When both the upper neighboring block and the left neighboring block do not have Intra 16×16 block types, entropy decoding unit 60 may select the coding table that associates a shorter variable length codeword with the Intra 4×4/8×8 block types and associates a longer codeword with the Intra 16×16 block type. Entropy decoding unit 60 decodes the block type of the current block using the coding table selected based on the neighboring blocks.

Although in the example described above entropy decoding unit 60 selects the coding table based on neighboring blocks, entropy decoding unit 60 may select the coding table based on other criteria. For example, entropy decoding unit 60 may select the coding table based on a percentage of previously encoded blocks that have Intra 16×16 block types exceeding a threshold, e.g., at least 10 of the last 20 previously encoded blocks have Intra 16×16 block types. Moreover, entropy decoding unit 60 may adaptively select a coding table for decoding of the block type of inter-coded blocks in addition to intra-coded blocks.

Entropy decoding unit 60 additionally decodes the prediction mode, luma CBP and chroma CBP of the current block. As described above, entropy encoding unit 46 (FIG. 2) may predict one or more other syntax elements, e.g., the prediction mode and the luma/chroma CBPs, for the current block from syntax elements of one or more neighboring blocks. In instances in which prediction is successful, entropy encoding unit 46 bundles the prediction mode and the luma/chroma CBPs and transmits a flag (e.g., a 1-bit flag) indicating that prediction is successful. Thus, entropy decoding unit 60 may also perform prediction of one or more syntax elements in the same manner as entropy encoding unit 46. For example, entropy decoding unit 60 may predict the prediction mode syntax element and the luma/chroma CBP syntax elements of the current block from one or more of the previous blocks, e.g., the upper and left neighboring blocks. Entropy decoding unit 60 may predict the prediction mode and the luma/chroma CBPs of the current block to be the prediction mode and the luma/chroma CBPs of one of the neighboring blocks when at least one of the neighboring blocks has an Intra 16×16 block type. If the flag in the encoded bitstream indicates that prediction of the prediction mode and CBPs is successful, entropy decoding unit 60 selects the predicted prediction mode and CBPs as the prediction mode and CBPs of the current block.

When the flag of the encoded bitstream indicates the prediction is not successful, entropy decoding unit 60 receives the prediction mode, luma CBP and chroma CBP as separate codewords. Entropy decoding unit 60 may decode the prediction mode using a coding table with 2-bit fixed length codes that correspond with one of the four Intra 16×16 prediction modes. For example, the vertical prediction mode may correspond to codeword "00", the horizontal prediction mode may correspond to codeword "01", the DC prediction mode may correspond to codeword "10" and the plane prediction mode may correspond to codeword "11". Entropy decoding unit 60 may decode the luma CBP (which indicates whether there are any non-zero luma coefficients) using a coding table with 1-bit fixed length codewords. Entropy decoding unit 60 may decode the chroma CBP (which indicates whether there are any non-zero chroma coefficients) using a coding table with variable length codewords. For example, the chroma coding table may include codeword "0" to indicate that all chroma AC and DC coefficients are zero, codeword "10" to indicate that there is at least one non-zero chroma DC coefficient but no non-zero chroma AC coefficients, and codeword "11" to indicate that there is at least one non-zero chroma DC coefficient and at least one non-zero chroma AC coefficient.

In some aspects, entropy encoding unit 46 (FIG. 2) may attempt to predict the prediction mode when prediction of the combination of prediction mode and luma/chroma CBPs fails, and encode a flag indicating whether prediction of the prediction mode is successful. Entropy decoding unit 60 may therefore also perform prediction of the prediction mode based on one or more neighboring blocks. For example, entropy decoding unit 60 may predict the prediction mode of the current block to be the prediction mode of one of the neighboring blocks when at least one of the neighboring blocks has an Intra 16×16 block type. If the flag indicates that prediction of the prediction mode is successful, entropy decoding unit 60 selects the predicted prediction mode as the prediction mode of the current block. If the flag indicates that prediction is unsuccessful or entropy decoding unit 60 is not configured to predict the prediction mode, entropy decoding unit 60 decodes the prediction mode separately.

Following the entropy decoding of the encoded video data performed by entropy decoding unit 60, video decoder 26 reconstructs the frames of video sequence block by block using the header information and the residual information. Entropy decoding unit 60 generates a prediction block using at least a portion of the header information. For example, in the case of an intra-coded block (or slice), entropy decoding unit 60 may provide at least a portion of the header information (such as the block type and the prediction mode for this block) to spatial prediction unit 62 for generation of a prediction block. Spatial prediction unit 62 generates a prediction block using one or more adjacent blocks (or portions of the adjacent blocks) within a common slice in accordance with the header information. Spatial prediction unit 30 may, for example, generate a prediction block of the partition size indicated by the block type syntax element using the intra-prediction mode specified by the prediction mode syntax element. The one or more adjacent blocks (or portions of the adjacent blocks) within the current slice may, for example, be retrieved from frame store 68.

In the case of an inter-coded block (or slice) entropy decoding unit 60 may provide at least a portion of the header information to motion compensation unit 63 for generation of a prediction block. Motion compensation unit 63 may, for example, receive one or more motion vectors and block types from entropy decoding unit 60 and one or more reconstructed reference frames from reference frame store 68 and generates a prediction block, i.e., a motion compensated block.

Entropy decoding unit 60 provides the residual information, e.g., in the form of one or more quantized residual coefficients, to inverse quantization unit 64. Inverse quantization unit 64 inverse quantizes, i.e., de-quantizes, the quantized residual coefficients. Inverse transform unit 66 applies an inverse transform, e.g., an inverse DCT or inverse 4×4 or 8×8 integer transform, to the de-quantized residual coefficients to produce residual information. Summer 69 sums the prediction block generated by spatial prediction unit 62 with the residual block from inverse transform unit 66 to form a decoded block.

Block-based video coding can sometimes result in visually perceivable blockiness at block boundaries of a coded video frame. In such cases, deblock filtering may smooth the block boundaries to reduce or eliminate the visually perceivable blockiness. As such, a deblocking filter (not shown) may also be applied to filter the decoded blocks in order to reduce or remove blockiness. Following any optional deblock filtering, the reconstructed blocks are then placed in frame store 68, which provides reference blocks for spatial and temporal prediction and also produces decoded video to drive display device (such as device 28 of FIG. 1).

Figure 5:
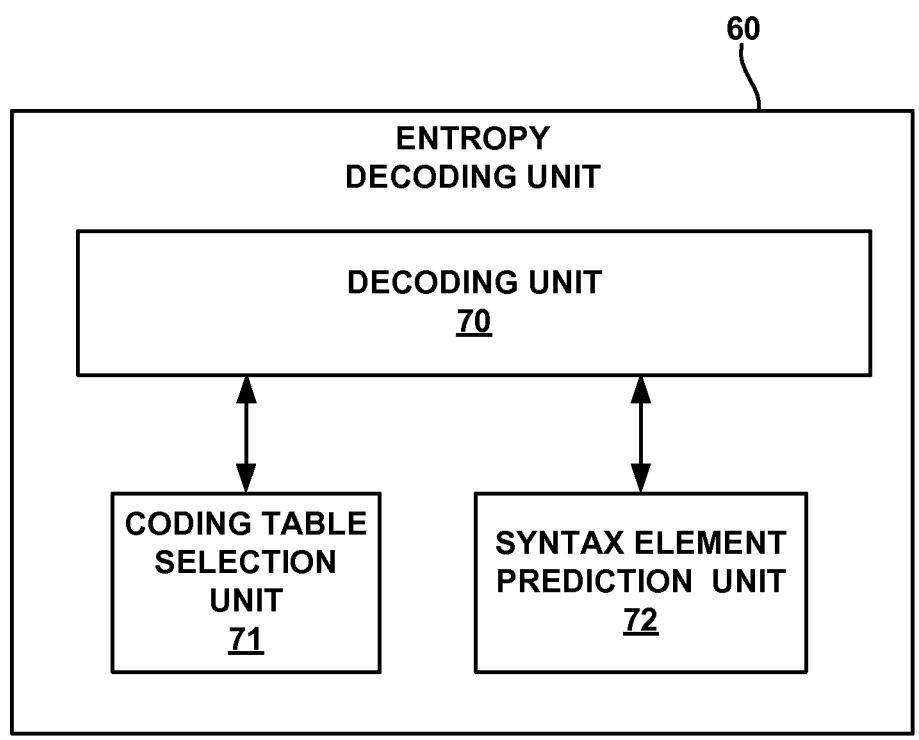
FIG. 5 is a block diagram illustrating an example decoding unit in further detail.

FIG. 5 is a block diagram illustrating an example decoding unit, such as entropy decoding unit 60 of video decoder 26, in further detail. Entropy decoding unit 60 receives encoded video data for a block and decodes the video data to generate block data in the form of residual information and header information. In the example of FIG. 3, entropy encoding unit 46 includes a decoding unit 70, a coding table selection unit 71, and a syntax element prediction unit 72.

Coding table selection unit 71 and syntax element prediction unit 72 are substantially similar to coding table selection unit 52 and syntax element selection unit 54 of FIG. 3. Coding table selection unit 71 adaptively selects a coding table for use by decoding unit 70 in decoding a block type syntax element of the current block based on the block types of previously decoded blocks as described in detail above. Syntax element prediction unit 72 predicts one or more other syntax elements of the current block based on at least one previously decoded block and provides the predicted syntax elements to decoding unit 70. Decoding unit 70 receives the predicted syntax elements from syntax element prediction unit 72, and if a flag in the encoded bitstream indicates successful prediction at the encoder, decoding unit 70 selects the predicted syntax elements as the syntax elements of the current block.

Figure 6:
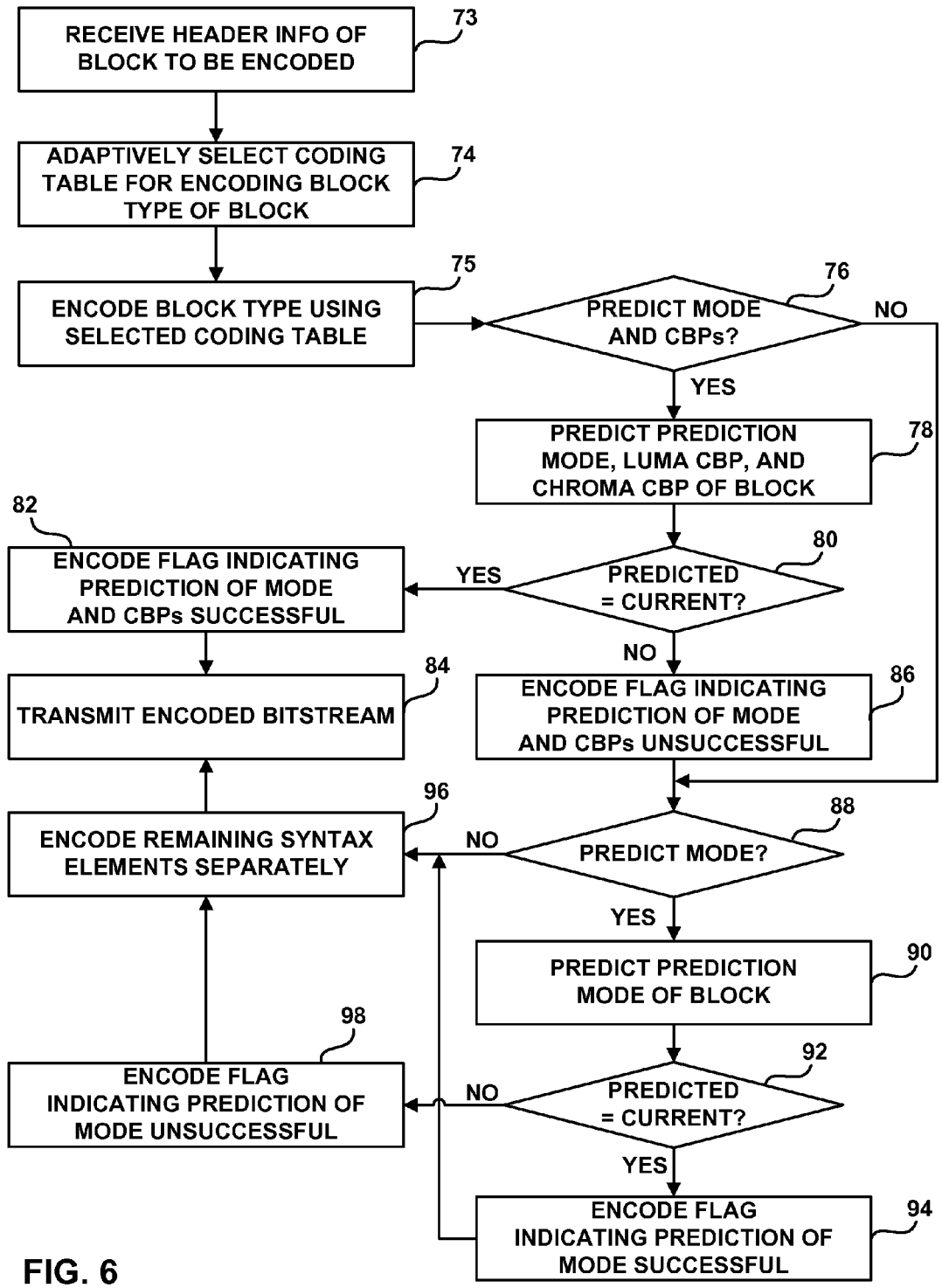
FIG. 6 is a flow diagram illustrating example operation of an encoding unit encoding header information for a video block.

FIG. 6 is a flow diagram illustrating example operation of an encoding unit, such as entropy encoding unit 46 of video encoder 20, encoding header information for a video block in accordance with the techniques of this disclosure. FIG. 6 is described in the context of encoding a block type syntax element of the block. However, as described above, the techniques of this disclosure may further be applied to adaptively select a coding table for coding other syntax elements of the current video block, such as a prediction mode, a luma CBP, a chroma CBP, a block partition, a motion vector, or the like. Entropy encoding unit 46 receives header information of video block to be encoded (73). The header information of the video block may include a number of syntax elements that identify particular characteristics of the block, such as a block type, a prediction mode, a luma CBP and a chroma CBP.

Entropy encoding unit 46 adaptively selects a coding table for use in encoding the block type of the block based on the block types of previously encoded blocks (74). In one example, entropy encoding unit 46 may adaptively select the coding table for use in encoding the block type of the current block based on one or more neighboring video blocks, e.g., based on the block type of an upper neighboring block and a left neighboring block. For an intra-coded block, entropy encoding unit 46 may select a coding table that associates the Intra 4×4 or 8×8 block types with a shorter codeword than the Intra 16×16 block type when the upper neighboring block and the left neighboring block do not both have Intra 16×16 block types and select a coding table that associates the Intra 16×16 block type with a shorter codeword than the Intra 4×4 or 8×8 block types when the upper and left neighboring blocks both have Intra 16×16 block types. Entropy encoding unit 46 encodes the block type of the block in accordance with the selected coding table (75).

Entropy encoding unit 46 determines whether to predict a prediction mode, luma CBP and chroma CBP of the current block from one or more previously encoded blocks (76). When entropy encoding unit 46 is configured to predict the prediction mode, luma CBP and chroma CBP, entropy encoding unit 46 generates those predictions (78). For example, entropy encoding unit 46 may predict the prediction mode and the luma/chroma CBPs of the current block to be the prediction mode and the luma/chroma CBP of one of the neighboring blocks when at least one of the neighboring blocks has an Intra 16×16 block type.

Entropy encoding unit 46 determines whether the prediction mode and the luma/chroma CBPs of the current block are the same as the predicted prediction mode and luma/chroma CBPs (80). If the prediction mode and luma/chroma CBPs are the same as predicted, entropy encoding unit 46 encodes a flag that indicates prediction of the mode and CBPs is successful (82). Entropy encoding unit 46 transmits the encoded bitstream (84). In this case, the encoded bitstream includes the encoded block type syntax element and the encoded flag.

If predicted prediction mode and luma/chroma CBPs are not the same as the prediction mode and luma/chroma CBPs of the current block, entropy encoding unit 46 encodes the flag to indicate that the prediction was unsuccessful (86). After encoding the flag to indicate that the prediction of the mode and CBPs was unsuccessful or when entropy encoding unit 46 does not perform prediction of the mode and CBPs, entropy encoding unit 46 determines whether to predict the prediction mode of the current block (88). When entropy encoding unit 46 is not configured to predict the prediction mode, entropy encoding unit 46 encodes the remaining header syntax elements separately (96). In this case, the remaining header syntax elements include block type, prediction mode, and the luma and chroma CBPs. When entropy encoding unit 46 is configured to predict the prediction mode, entropy encoding unit 46 may predict the prediction mode of the current block to be the prediction mode of one of the neighboring blocks when at least one of the neighboring blocks has an Intra 16×16 block type (90).

Entropy encoding unit 46 determines whether the prediction mode of the current block is the same as the predicted prediction mode (92). If prediction mode of the current block is the same as the predicted prediction mode, entropy encoding unit 46 encodes a flag to indicate the prediction of the prediction mode is successful (94). Entropy encoding unit 46 additionally encodes the remaining header syntax elements separately (96). In this case, the remaining header syntax elements include the luma CBP and chroma CBP.

If prediction mode of the current block is not the same as the predicted prediction mode, entropy encoding unit 46 encodes a flag to indicate the prediction of the prediction mode is unsuccessful (98). Entropy encoding unit 46 encodes the remaining header syntax elements separately (96). In this case, the remaining header syntax elements include the prediction mode as well as the luma and chroma CBPs. After encoding the remaining syntax elements, entropy encoding unit 46 transmits the encoded bitstream (84). Entropy encoding unit 46 may transmit the encoded data as it is generated, e.g., transmit the encoded block type when it is generated followed by the encoded flag. Alternatively, entropy encoding unit 46 may store the encoded data for the block and transmit the encoded data for the block at the same time. Alternatively, entropy encoding unit 46 may store the encoded data for all the blocks in the slice and transmit the encoded data for all the blocks in the slice at the same time.

Figure 7:
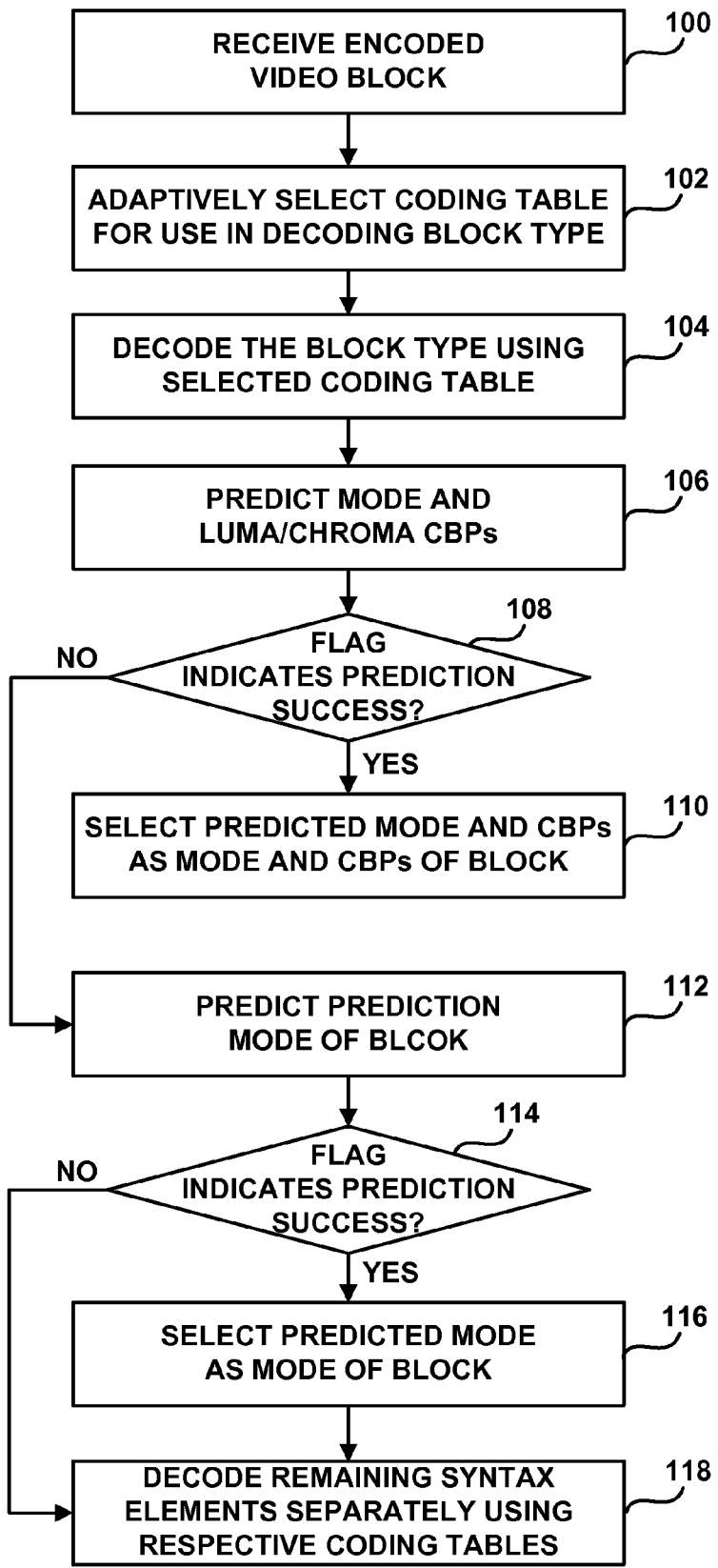
FIG. 7 is a flow diagram illustrating example operation of a decoding unit decoding an encoded video block of a video sequence.

FIG. 7 is a flow diagram illustrating example operation of a decoding unit, such as entropy decoding unit 60 of receive video decoder 26, decoding header information of a video block in accordance with the techniques of this disclosure. FIG. 7 is described in the context of decoding a block type syntax element of the block. However, as described above, the techniques of this disclosure may further be applied to adaptively select a coding table for decoding other syntax elements of the current video block, such as a prediction mode, a luma CBP, a chroma CBP, a block partition, a motion vector or the like. Entropy decoding unit 60 receives an encoded video block (100). Entropy decoding unit 60 adaptively selects a coding table for use in decoding a block type of the encoded block (102). In one aspect, entropy decoding unit 60 adaptively selects the coding table for decoding the block type of the current block based on the block types of one or more previously decoded blocks of the current slice. For an intra-coded block, for example, entropy decoding unit 60 may select a coding table that associates a shorter codeword to the Intra 16×16 block type than the Intra 4×4 or 8×8 block types when both an upper neighboring block and a left neighboring block have Intra 16×16 block types and selects a coding table that associates a shorter codeword to the Intra 4×4/8×8 block types than the Intra 16×16 block type when at least one of the upper neighboring block and the left neighboring block does not have an Intra 16×16 block type. In other aspects, entropy decoding unit 60 may select the coding table based on other criteria, e.g., based on a percentage of previously decoded blocks that have Intra 16×16 block types. In order to maintain encoder and decoder synchronization, the encoder and at the decoder use the same criterion to select the coding tables. Entropy decoding unit 60 decodes the block type of the current block using the selected coding table (104).

Entropy decoding unit 60 also may predict the prediction mode and the luma/chroma CBPs for the current block from the prediction mode and the luma/chroma CBP of one or more neighboring blocks (106). For example, entropy decoding unit 60 may predict the prediction mode and the luma/chroma CBPs of the current block to be the prediction mode and the luma/chroma CBPs of one of the neighboring blocks when at least one of the neighboring blocks has an Intra 16×16 block type. Entropy decoding unit 60 may determine whether a flag in the encoded bitstream indicates that the prediction of the prediction mode and CBPs is successful (108). If the flag in the encoded bitstream indicates that prediction of the prediction mode and CBPs is successful, e.g., the flag representing success of the prediction is equal to one, entropy decoding unit 60 may select the predicted prediction mode and CBPs as the prediction mode and CBPs of the current block (110).

When prediction of the prediction mode and luma/chroma CBPs is unsuccessful, e.g., the flag representing success of the prediction is equal to zero, entropy decoding unit 60 may predict the prediction mode of the block from the prediction mode of one or more neighboring blocks (112). For example, entropy decoding unit 60 may predict the prediction mode of the current block to be the prediction mode of one of the neighboring blocks when at least one of the neighboring blocks has an Intra 16×16 block type. Entropy decoding unit 60 determines whether a flag in the encoded bitstream indicates that the prediction of the prediction mode is successful (114). The flag may, for example be set to 1 when prediction of the prediction mode is successful and set to 0 when prediction of the prediction mode is unsuccessful. If the flag indicates that prediction of the prediction mode is successful, entropy decoding unit 60 selects the predicted prediction mode as the prediction mode of the current block (116).

After selecting the predicted prediction mode as the prediction mode of the current block or when the flag indicates that prediction of the prediction mode is unsuccessful, entropy decoding unit 60 decodes the remaining header syntax elements of the block separately using respective coding tables (118). When the prediction mode is predicted successfully, the remaining header syntax elements decoded by entropy decoding unit 60 include the luma and chroma CBPs. When the prediction of the prediction mode is unsuccessful, the remaining header syntax elements decoded by entropy decoding unit 60 include the prediction mode, the luma CBP, and the chroma CBP using respective coding tables (118).

The techniques described in this disclosure may be implemented in hardware, software, firmware, or any combination thereof. Any features described as units or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software units or hardware units configured for encoding and decoding, or incorporated in a combined video encoder-decoder (CODEC). Depiction of different features as units is intended to highlight different functional aspects of the devices illustrated and does not necessarily imply that such units must be realized by separate hardware or software components. Rather, functionality associated with one or more units may be integrated within common or separate hardware or software components.

Various embodiments of the invention have been described. These and other embodiments are within the scope of the following claims.

The invention claimed is:

1. A method of encoding video data, the method comprising:
    selecting a coding table to use for encoding a syntax element of a current video block of a coded unit based on a corresponding syntax element of one or more previously encoded video blocks of the coded unit, wherein the syntax element of the current video block identifies a block type of the current video block,
    wherein selecting the coding table comprises selecting, based on a heuristic, a first coding table that associates a first block type with a shorter codeword than codewords for other block types when an upper neighboring block and a left neighboring block of the current video block among the one or more previously encoded video blocks each are of the first block type, and
    wherein selecting the coding table comprises selecting, based on the heuristic, a second coding table that associates at least one of the other block types with a shorter codeword than a codeword associated with the first block type when at least one of the upper neighboring block and the left neighboring block is not of the first block type; and
    encoding the syntax element of the current video block using the selected one of the first and second coding tables.

2. The method of claim 1, wherein the first block type is an Intra 16×16 block type and the other block types include at least an Intra 4×4 block type and an Intra 8×8 block type.

3. The method of claim 1, wherein the syntax element comprises a first header syntax element of the current video block, the method further comprising:
    predicting at least one other header syntax element of the current video block based on one of the one or more previously encoded video blocks; and
    encoding a flag to indicate that the prediction of the at least one other header syntax element is successful when the at least one predicted header syntax element is the same as the actual header syntax element of the current video block.

4. The method of claim 3, wherein:
    predicting at least one other header syntax element of the current video block comprises predicting together a prediction mode, a luma coded block pattern (CBP), and a chroma CBP of the current video block based on one of the one or more previously encoded video blocks; and
    encoding the flag comprises encoding the flag to indicate that the prediction of the prediction mode, the luma CBP, and the chroma CBP together is successful when the predicted prediction mode, luma CBP, and chroma CBP are the same as the actual prediction mode, luma CBP, and chroma CBP of the current video block.

5. The method of claim 4, further comprising:
    encoding the flag to indicate that the prediction of the prediction mode, the luma CBP, and the chroma CBP together is unsuccessful when the predicted prediction mode, luma CBP, and chroma CBP are not the same as the actual prediction mode, luma CBP, and chroma CBP of the current video block; and
    encoding each of the prediction mode, the luma CBP, and the chroma CBP separately.

6. The method of claim 5, wherein the flag is a first flag, and encoding each of the prediction mode, the luma CBP, and the chroma CBP separately comprises:
    predicting the prediction mode of the current video block based on one of the one or more previously encoded video blocks; and
    encoding a second flag to indicate that the prediction of the prediction mode is successful when the predicted prediction mode is the same as the actual prediction mode of the current video block.

7. The method of claim 1, wherein the one or more previously encoded video blocks comprise video blocks that are adjacent to the current video block.

8. The method of claim 7, wherein the one or more previously encoded video blocks that are adjacent to the current video block comprise at least a first previously encoded adjacent video block located directly above the current video block and a second previously encoded adjacent video block located directly to the left of the current video block.

9. The method of claim 1, further comprising transmitting the encoded syntax element.

10. The method of claim 1, wherein the coded unit comprises one of a frame and a slice.

11. An encoding device comprising an encoding unit that includes:
    a selection unit that selects a coding table to use for encoding a syntax element of a current video block of a coded unit based on a corresponding syntax element of one or more previously encoded video blocks of the coded unit, wherein the syntax element of the current video block identifies a block type of the current video block, wherein the selection unit selects, based on a heuristic, a first coding table that associates a first block type with a shorter codeword than codewords for other block types when an upper neighboring block and a left neighboring block of the current video block among the one or more previously encoded video blocks each are of the first block type, and wherein the selection unit selects, based on the heuristic, a second coding table that associates at least one of the other block types with a shorter codeword than a codeword associated with the first block type when at least one of the upper neighboring block and the left neighboring block is not of the first block type; and a coding unit that encodes the syntax element of the current video block using the selected one of the first and second coding tables.

12. The device of claim 11, wherein the first block type is an Intra 16×16 block type and the other block types include at least an Intra 4×4 block type and an Intra 8×8 block type.

13. The device of claim 11, wherein the syntax element comprises a first header syntax element of the current video block, the device further comprising:

a prediction unit that predicts at least one other header syntax element of the current video block based on one of the one or more previously encoded video blocks;

wherein the coding unit encodes a flag to indicate that the prediction of the at least one other header syntax element is successful when the at least one predicted header syntax element is the same as the actual header syntax element of the current video block.

14. The device of claim 13, wherein:

the prediction unit predicts together a prediction mode, a luma coded block pattern (CBP), and a chroma CBP of the current video block based on one of the one or more previously encoded video blocks; and the coding unit encodes the flag to indicate that the prediction of the prediction mode, the luma CBP, and the chroma CBP together is successful when the predicted prediction mode, luma CBP, and chroma CBP are the same as the actual prediction mode, luma CBP, and chroma CBP of the current video block.

15. The device of claim 14, wherein the coding unit encodes the flag to indicate that the prediction of the prediction mode, the luma CBP, and the chroma CBP together is unsuccessful when the predicted prediction mode, luma CBP, and chroma CBP are not the same as the actual prediction mode, luma CBP, and chroma CBP of the current video block and encodes each of the prediction mode, the luma CBP, and the chroma CBP separately.

16. The device of claim 15, wherein the flag is a first flag, and the prediction unit predicts the prediction mode of the current video block based on one of the one or more previously encoded video blocks; and the coding unit encodes a second flag to indicate that the prediction of the prediction mode is successful when the predicted prediction mode is the same as the actual prediction mode of the current video block.

17. The device of claim 11, wherein the one or more previously encoded video blocks comprise video blocks that are adjacent to the current video block.

18. The device of claim 17, wherein the one or more previously encoded video blocks that are adjacent to the current video block comprise at least a first previously encoded adjacent video block located directly above the current video block and a second previously encoded adjacent video block located directly to the left of the current video block.

19. The device of claim 11, further comprising a transmitter that transmits the encoded syntax element.

20. The device of claim 11, wherein the coded unit comprises one of a frame and a slice.

21. The device of claim 11, wherein the device comprises a wireless communication device.

22. The device of claim 11, wherein the device comprises an integrated circuit device.

23. A non-transitory computer-readable medium comprising instructions to cause a processor to:

select a coding table to use for encoding a syntax element of a current video block of a coded unit based on a corresponding syntax element of one or more previously encoded video blocks of the coded unit, wherein the syntax element of the current video block identifies a block type of the current video block, wherein the instructions to cause the processor to select the coding table comprise instructions to cause the processor to select, based on a heuristic, a first coding table that associates a first block type with a shorter codeword than codewords for other block types when an upper neighboring block and a left neighboring block of the current video block among the one or more previously encoded video blocks each are of the first block type, and wherein the instructions to cause the processor to select, based on the heuristic, the coding table comprise instructions to cause the processor to select a second coding table that associates at least one of the other block types with a shorter codeword than a codeword associated with the first block type when at least one of the upper neighboring block and the left neighboring block is not of the first block type; and encode the syntax element of the current video block using the selected one of the first and second coding tables.

24. The non-transitory computer-readable medium of claim 23, wherein the first block type is an Intra 16×16 block type and the other block types include at least an Intra 4×4 block type and an Intra 8×8 block type.

25. The non-transitory computer-readable medium of claim 23, wherein the syntax element comprises a first header syntax element of the current video block, the computer-readable medium further comprising instructions to cause the processor to:

predict at least one other header syntax element of the current video block based on one of the one or more previously encoded video blocks; and encode a flag to indicate that the prediction of the at least one other header syntax element is successful when the at least one predicted header syntax element is the same as the actual header syntax element of the current video block.

26. The non-transitory computer-readable medium of claim 25, wherein:

instructions to cause the processor to predict at least one other header syntax element of the current video block comprise instructions to cause the processor to predict together a prediction mode, a luma coded block pattern (CBP), and a chroma CBP of the current video block based on one of the one or more previously encoded video blocks; and instructions to cause the processor to encode the flag comprise instructions to cause the processor to encode the flag to indicate that the prediction of the prediction mode, the luma CBP, and the chroma CBP together is successful when the predicted prediction mode, luma CBP, and chroma CBP are the same as the actual prediction mode, luma CBP, and chroma CBP of the current video block.

27. The non-transitory computer-readable medium of claim 26, further comprising instructions to cause the processor to:

encode the flag to indicate that the prediction of the prediction mode, the luma CBP, and the chroma CBP together is unsuccessful when the predicted prediction mode, luma CBP, and chroma CBP are not the same as the actual prediction mode, luma CBP, and chroma CBP of the current video block; and encode each of the prediction mode, the luma CBP, and the chroma CBP separately.

28. The non-transitory computer-readable medium of claim 27, wherein the flag is a first flag, and instructions to cause the processor to encode each of the prediction mode, the luma CBP, and the chroma CBP separately comprises instructions to cause the processor to:

predict the prediction mode of the current video block based on one of the one or more previously encoded video blocks; and encode a second flag to indicate that the prediction of the prediction mode is successful when the predicted prediction mode is the same as the actual prediction mode of the current video block.

29. The non-transitory computer-readable medium of claim 23, wherein the one or more previously encoded video blocks comprise video blocks that are adjacent to the current video block.

30. The non-transitory computer-readable medium of claim 29, wherein the one or more previously encoded video blocks that are adjacent to the current video block comprise at least a first previously encoded adjacent video block located directly above the current video block and a second previously encoded adjacent video block located directly to the left of the current video block.

31. The non-transitory computer-readable medium of claim 23, further comprising instructions to cause the processor to transmit the encoded syntax element.

32. The non-transitory computer-readable medium of claim 23, wherein the coded unit comprises one of a frame and a slice.

33. An encoding device comprising:

means for selecting a coding table to use for encoding a syntax element of a current video block of a coded unit based on a corresponding syntax element of one or more previously encoded video blocks of the coded unit, wherein the syntax element of the current video block identifies a block type of the current video block, wherein the selecting means selects, based on a heuristic, a first coding table that associates a first block type with a shorter codeword than codewords for other block types when an upper neighboring block and a left neighboring block of the current video block among the one or more previously encoded video blocks each are of the first block type, and wherein the selecting means selects, based on the heuristic, a second coding table that associates at least one of the other block types with a shorter codeword than a codeword associated with the first block type when at least one of the upper neighboring block and the left neighboring block is not of the first block type; and means for encoding the syntax element of the current video block using the selected one of the first and second coding tables.

34. The device of claim 33, wherein the first block type is an Intra 16×16 block type and the other block types include at least an Intra 4×4 block type and an Intra 8×8 block type.

35. The device of claim 33, wherein the syntax element comprises a first header syntax element of the current video block, the device further comprising:

means for predicting at least one other header syntax element of the current video block based on one of the one or more previously encoded video blocks;

wherein the encoding means a flag to indicate that the prediction of the at least one other header syntax element is successful when the at least one predicted header syntax element is the same as the actual header syntax element of the current video block.

36. The device of claim 35, wherein:

the predicting means predicts together a prediction mode, a luma coded block pattern (CBP), and a chroma CBP of the current video block based on one of the one or more previously encoded video blocks; and the encoding means encodes the flag to indicate that the prediction of the prediction mode, the luma CBP, and the chroma CBP together is successful when the predicted prediction mode, luma CBP, and chroma CBP are the same as the actual prediction mode, luma CBP, and chroma CBP of the current video block.

37. The device of claim 36, wherein the encoding means encodes the flag to indicate that the prediction of the prediction mode, the luma CBP, and the chroma CBP together is unsuccessful when the predicted prediction mode, luma CBP, and chroma CBP are not the same as the actual prediction mode, luma CBP, and chroma CBP of the current video block, and encodes each of the prediction mode, the luma CBP, and the chroma CBP separately.

38. The device of claim 37, wherein the flag is a first flag, and:

the predicting means predicts the prediction mode of the current video block based on one of the one or more previously encoded video blocks; and the encoding means encodes a second flag to indicate that the prediction of the prediction mode is successful when the predicted prediction mode is the same as the actual prediction mode of the current video block.

39. The device of claim 33, wherein the one or more previously encoded video blocks comprises video blocks that are adjacent to the current video block.

40. The device of claim 39, wherein the one or more previously encoded video blocks that are adjacent to the current video block comprise at least a first previously encoded adjacent video block located directly above the current video block and a second previously encoded adjacent video block located directly to the left of the current video block.

41. The device of claim 33, further comprising means for transmitting the encoded syntax element.

42. The device of claim 33, wherein the coded unit comprises one of a frame and a slice.

43. A method of decoding video data, the method comprising:

selecting a coding table from a plurality of coding tables to use for decoding a syntax element of a current video block of a coded unit based on a corresponding syntax element of one or more previously decoded video blocks of the coded unit, wherein the syntax element of the current video block identifies a block type of the current video block, wherein selecting the coding table comprises selecting, based on a heuristic, a first coding table that associates a first block type with a shorter codeword than codewords for other block types when an upper neighboring block and a left neighboring block of the current video block among the one or more previously decoded video blocks each are of the first block type, and wherein selecting the coding table comprises selecting, based on the heuristic, a second coding table that associates at least one of the other block types with a shorter codeword than a codeword associated with the first block type when at least one of the upper neighboring block and the left neighboring block is not of the first block type; and decoding the syntax element of the current video block using the selected one of the first and second coding tables.

44. The method of claim 43, wherein the first block type is an Intra 16×16 block type and the other block types include at least an Intra 4×4 block type and an Intra 8×8 block type.

45. The method of claim 43, wherein the syntax element comprises a first header syntax element of the current video block, the method further comprising:

predicting at least one other header syntax element of the current video block based on one of the one or more previously decoded video blocks; and selecting the at least one predicted syntax element as the syntax element of the current video block when a flag indicates that the prediction of the syntax element is successful.

46. The method of claim 45, wherein:

predicting at least one other header syntax element of the current video block comprises predicting together a prediction mode, a luma coded block pattern (CBP), and a chroma CBP of the current video block based on one of the one or more previously decoded video blocks; and selecting the at least one predicted syntax element comprises selecting the predicted prediction mode, luma CBP, and chroma CBP together as the prediction mode, luma CBP and chroma CBP of the current video block when a flag indicates that the prediction of the prediction mode, the luma CBP, and the chroma CBP together is successful.

47. The method of claim 46, further comprising separately decoding each of the prediction mode, the luma CBP, and the chroma CBP when the flag indicates that the prediction of the prediction mode, the luma CBP, and the chroma CBP together is unsuccessful.

48. The method of claim 47, wherein the flag is a first flag, and separately decoding each of the prediction mode, the luma CBP, and the chroma CBP comprises:

predicting the prediction mode of the current video block based on one of the one or more previously decoded video blocks; and selecting the predicted prediction block as the prediction mode of the current video block when a second flag indicates that the prediction of the prediction mode is successful.

49. The method of claim 43, wherein the one or more previously decoded video blocks comprise video blocks that are adjacent to the current video block.

50. The method of claim 49, wherein the one or more previously decoded video blocks that are adjacent to the current video block comprise at least a first previously decoded adjacent video block located directly above the current video block and a second previously decoded adjacent video block located directly to the left of the current video block.

51. The method of claim 43, wherein
the coded unit comprises one of a frame and a slice.

52. A decoding device comprising:

a selection unit that selects a coding table from a plurality of coding tables to use for decoding a syntax element of a current encoded video block of a coded unit based on a corresponding syntax element of one or more previously decoded video blocks of the coded unit, wherein the syntax element of the current video block identifies a block type of the current video block, wherein the selection unit selects, based on a heuristic, a first coding table that associates a first block type with a shorter codeword than codewords for other block types when an upper neighboring block and a left neighboring block of the current video block among the one or more previously decoded video blocks each are of the first block type, and wherein the selection unit selects, based on a heuristic, a second coding table that associates at least one of the other block types with a shorter codeword than a codeword associated with the first block type when at least one of the upper neighboring block and the left neighboring block is not of the first block type; and a decoding unit that decodes the syntax element of the current video block using the selected one of the first and second coding tables.

53. The device of claim 52, wherein the first block type is an Intra 16×16 block type and the other block types include at least an Intra 4×4 block type and an Intra 8×8 block type.

54. The device of claim 52, wherein the syntax element comprises a first header syntax element of the current video block, the device further comprising:

a prediction unit that predicts at least one other header syntax element of the current video block based on one of the one or more previously decoded video blocks;

wherein the decoding unit selects the at least one predicted syntax element as the syntax element of the current video block when a flag indicates that the prediction of the syntax element is successful.

55. The device of claim 54, wherein:

the prediction unit predicts together a prediction mode, a luma coded block pattern (CBP), and a chroma CBP of the current video block based on one of the one or more previously decoded video blocks; and the decoding unit selects the predicted prediction mode, luma CBP, and chroma CBP together as the prediction mode, luma CBP and chroma CBP of the current video block when a flag indicates that the prediction of the prediction mode, the luma CBP, and the chroma CBP together is successful.

56. The device of claim 55, wherein the decoding unit separately decodes each of the prediction mode, the luma CBP, and the chroma CBP when the flag indicates that the prediction of the prediction mode, the luma CBP, and the chroma CBP together is unsuccessful.

57. The device of claim 56, wherein the flag is a first flag, and the prediction unit predicts the prediction mode of the current video block based on one of the one or more previously decoded video blocks; and the decoding unit selects the predicted prediction block as the prediction mode of the current video block when a second flag indicates that the prediction of the prediction mode is successful.

58. The device of claim 52, wherein the one or more previously decoded video blocks comprise video blocks that are adjacent to the current video block.

59. The device of claim 58, wherein the one or more previously decoded video blocks that are adjacent to the current video block comprise at least a first previously decoded adjacent video block located directly above the current video block and a second previously decoded adjacent video block located directly to the left of the current video block.

60. The device of claim 52, wherein the device comprises a wireless communication device.

61. The device of claim 52, wherein the device comprises an integrated circuit device.

62. The device of claim 52, wherein
the coded unit comprises one of a frame and a slice.

63. A non-transitory computer-readable medium comprising instructions to cause a processor to:
select a coding table to use for decoding a syntax element of a current encoded video block of a coded unit based on a corresponding syntax element of one or more previously decoded video blocks of the coded unit, wherein the syntax element of the current video block identifies a block type of the current video block, wherein the instructions to cause the processor to select the coding table comprise instructions to cause the processor to select, based on a heuristic, a first coding table that associates a first block type with a shorter codeword than codewords for other block types when an upper neighboring block and a left neighboring block of the current video block among the one or more previously decoded video blocks each are of the first block type, and wherein the instructions to cause the processor to select, based on the heuristic, the coding table comprise instructions to cause the processor to select a second coding table that associates at least one of the other block types with a shorter codeword than a codeword associated with the first block type when at least one of the upper neighboring block and the left neighboring block is not of the first block type; and
decode the syntax element of the current video block using the selected one of the first and second coding tables.

64. The non-transitory computer-readable medium of claim 63, wherein the first block type is an Intra 16×16 block type and the other block types include at least an Intra 4×4 block type and an Intra 8×8 block type.

65. The non-transitory computer-readable medium of claim 63, wherein the syntax element comprises a first header syntax element of the current video block, the computer-readable medium further comprising instructions to cause the processor to:
predict at least one other header syntax element of the current video block based on one of the one or more previously decoded video blocks; and
select the at least one predicted syntax element as the syntax element of the current video block when a flag indicates that the prediction of the syntax element is successful.

66. The non-transitory computer-readable medium of claim 65, wherein:
instructions to cause the processor to predict at least one other header syntax element of the current video block comprises instructions to cause the processor to predict together a prediction mode, a luma coded block pattern (CBP), and a chroma CBP of the current video block based on one of the one or more previously decoded video blocks; and
instructions to cause the processor to select the at least one predicted syntax element comprises instructions to cause the processor to select the predicted prediction mode, luma CBP, and chroma CBP together as the prediction mode, luma CBP and chroma CBP of the current video block when a flag indicates that the prediction of the prediction mode, the luma CBP, and the chroma CBP together is successful.

67. The non-transitory computer-readable medium of claim 66, further comprising instructions to cause the processor to separately decode each of the prediction mode, luma CBP, and the chroma CBP when the flag indicates that the prediction of the prediction mode, the luma CBP, and the chroma CBP together is unsuccessful.

68. The non-transitory computer-readable medium of claim 67, wherein the flag is a first flag, and instructions to cause the processor to separately decode each of the prediction mode, the luma CBP, and the chroma CBP comprises instructions to cause the processor to:
predict the prediction mode of the current video block based on one of the one or more previously decoded video blocks; and
select the predicted prediction block as the prediction mode of the current video block when a second flag indicates that the prediction of the prediction mode is successful.

69. The non-transitory computer-readable medium of claim 63, wherein the one or more previously decoded video blocks comprise video blocks that are adjacent to the current video block.

70. The non-transitory computer-readable medium of claim 69, wherein the one or more previously decoded video blocks that are adjacent to the current video block comprise at least a first previously decoded adjacent video block located directly above the current video block and a second previously decoded adjacent video block located directly to the left of the current video block.

71. The non-transitory computer-readable medium of claim 63, wherein
the coded unit comprises one of a frame and a slice.

72. A decoding device comprising:
means for selecting a coding table to use for decoding a syntax element of a current encoded video block of a coded unit based on a corresponding syntax element of one or more previously decoded video blocks of the coded unit, wherein the syntax element of the current video block identifies a block type of the current video block, wherein the means for selecting selects, based on a heuristic, a first coding table that associates a first block type with a shorter codeword than codewords other block types when an upper neighboring block and a left neighboring block of the current video block among the one or more previously decoded video blocks each are of the first block type, and wherein the means for selecting selects, based on the heuristic, a second coding table that associates at least one of the other block types with a shorter codeword than a codeword associated with the first block type when at least one of the upper neighboring block and the left neighboring block is not of the first block type; and
means for decoding the syntax element of the current video block using the selected one of the first and second coding tables.

73. The device of claim 72, wherein the first block type is an Intra 16×16 block type and the other block types include at least an Intra 4×4 block type and an Intra 8×8 block type.

74. The device of claim 72, wherein the syntax element comprises a first header syntax element of the current video block, the device further comprising:
means for predicting at least one other header syntax element of the current video block based on one of the one or more previously decoded video blocks;
wherein the decoding means selects the at least one predicted syntax element as the syntax element of the current video block when a flag indicates that the prediction of the syntax element is successful.

75. The device of claim 74, wherein:
the predicting means predicts together a prediction mode, a luma coded block pattern (CBP), and a chroma CBP of the current video block based on one of the one or more previously decoded video blocks; and the decoding means selects the predicted prediction mode, luma CBP, and chroma CBP as the prediction mode, luma CBP and chroma CBP together of the current video block when a flag indicates that the prediction of the prediction mode, the luma CBP, and the chroma CBP together is successful.

76. The device of claim 75, wherein the decoding means separately decodes each of the prediction mode, the luma CBP, and the chroma CBP when the flag indicates that the prediction of the prediction mode, the luma CBP, and the chroma CBP is together unsuccessful.

77. The device of claim 76, wherein the flag is a first flag, and:

the predicting means predicts the prediction mode of the current video block based on one of the one or more previously decoded video blocks; and the decoding means selects the predicted prediction block as the prediction mode of the current video block when a second flag indicates that the prediction of the prediction mode is successful.

78. The device of claim 72, wherein the one or more previously decoded video blocks comprise video blocks that are adjacent to the current video block.

79. The device of claim 78, wherein the one or more previously decoded video blocks that are adjacent to the current video block comprise at least a first previously decoded adjacent video block located directly above the current video block and a second previously decoded adjacent video block located directly to the left of the current video block.

80. The device of claim 72, wherein
the coded unit comprises one of a frame and a slice.

81. The device of claim 72, wherein the device comprises a wireless communication device.

* * * * *